United States Patent
Jitsukawa et al.

(10) Patent No.: US 8,842,748 B2
(45) Date of Patent: Sep. 23, 2014

(54) DIGITAL MOBILE COMMUNICATION SYSTEM AND TRANSMISSION/RECEPTION METHOD THEREOF

(75) Inventors: Daisuke Jitsukawa, Kawasaki (JP); Hiroyuki Seki, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 1098 days.

(21) Appl. No.: 12/344,247

(22) Filed: Dec. 25, 2008

(65) Prior Publication Data

US 2009/0103645 A1    Apr. 23, 2009

Related U.S. Application Data

(63) Continuation of application No. PCT/JP2006/313078, filed on Jun. 30, 2006.

(51) Int. Cl.
*H04L 27/28*  (2006.01)
*H04L 25/03*  (2006.01)
*H04L 27/26*  (2006.01)
*H04W 28/18*  (2009.01)
*H04W 48/08*  (2009.01)
*H04W 48/16*  (2009.01)

(52) U.S. Cl.
CPC ...... *H04L 27/2607* (2013.01); *H04L 25/03834* (2013.01); *H04L 27/2646* (2013.01); *H04L 27/2688* (2013.01); *H04L 27/2666* (2013.01); *H04W 28/18* (2013.01); *H04L 27/2662* (2013.01); *H04W 48/08* (2013.01); *H04W 48/16* (2013.01)
USPC .......................................... 375/260; 375/259

(58) Field of Classification Search
CPC ............................................... H04L 25/03834
USPC .................................................. 375/260, 259
See application file for complete search history.

(56) References Cited

U.S. PATENT DOCUMENTS 4,026,215 A * 5/1977 Ziemba et al. ............... 102/206
6,553,230 B1 * 4/2003 Plestid et al. ............... 455/436

(Continued)

FOREIGN PATENT DOCUMENTS

JP    11-103285       4/1999
JP    11-103285 A    4/1999

(Continued)

OTHER PUBLICATIONS

International Search Report for the Corresponding International Application No. PCT/JP2006/313078; date of completion Sep. 22, 2006.

(Continued)

*Primary Examiner* — Michael Neff
(74) *Attorney, Agent, or Firm* — Myers Wolin, LLC

(57) ABSTRACT

A radio communication system in which a transmission station performs window function processing on a transmission symbol to which cyclic prefixes have been attached for each specified number of samples, then transmits the signal, and a receiving station extracts and demodulates effective signal portions from the received signal, wherein the transmission station uses a control channel to notify the receiving station of window width $N_{win}$ of the window function; the receiving station adjusts the extraction position of the received signal based on the window width notified from the transmission station; and the receiving station uses the extracted received signal to execute demodulation processing of the transmission symbol. With this system, in an environment in which there are both transmission stations that perform window function processing on a transmission signal and transmission stations that do not perform window function processing, it is possible for the receiving station to effectively use cyclic prefixes CP and to perform demodulation without receiving the effect of distortion caused by the window function processing.

12 Claims, 21 Drawing Sheets

(56) References Cited

U.S. PATENT DOCUMENTS

| | | | |
|---|---|---|---|
| 6,856,947 B2* | 2/2005 | Antoine et al. | 702/189 |
| 2002/0017948 A1* | 2/2002 | Hyakudai et al. | 329/304 |
| 2004/0005018 A1* | 1/2004 | Zhu et al. | 375/340 |
| 2005/0036563 A1 | 2/2005 | Suzuki et al. | |
| 2006/0133524 A1 | 6/2006 | Hamada et al. | |
| 2007/0253381 A1* | 11/2007 | Bachl et al. | 370/338 |

FOREIGN PATENT DOCUMENTS

| | | |
|---|---|---|
| JP | 2003-348041 | 12/2003 |
| JP | 2005-027259 | 1/2005 |
| JP | 2003-347947 | 12/2005 |
| JP | 2006-174364 | 6/2006 |

OTHER PUBLICATIONS

Koppler et al., "Timing of the FFT-Window in SC/FDE Systems", Fazel et al., "Multi-Carrier Spread Spectrum", Jan. 1, 2004, pp. 243-246, Kluwer Academic Publishers, Netherlands.

Bhushan et al., "An algorithm to determine the location of the FFT window and the delay spread for the Platinum Broadcast channel estimator", 3GPP2 Technical Specification Group C, Apr. 2005, pp. 1-8, 3rd Generation Partnership Project 2 (3GPP2), <URL: http://ftp.3gpp2.org/TSGC/Working/2005/2005-04-Dallas/TSG-C-2005-04-Dallas/WG3/>.

The extended European search report, the supplementary European search report and the European search opinion issued for corresponding European Patent Application No. 06767686.6, dated Jun. 17, 2014.

* cited by examiner

DIGITAL MOBILE COMMUNICATION SYSTEM AND TRANSMISSION/RECEPTION METHOD THEREOF

CROSS REFERENCE TO RELATED APPLICATION

This application is a continuation of PCT application of PCT/JP2006/313078, which was filed on Jun. 30, 2006.

BACKGROUND OF THE INVENTION

The present invention relates to a digital mobile communication system and transmission/reception method thereof, and more particularly to a digital mobile communication system and transmission/reception method thereof in which a transmission station and receiving station transmit or receive signals multiplied by an arbitrary time window.

Transmission methods such as OFDM (Orthogonal Frequency Division Multiplex) that use FFT (Fast Fourier Transform) and CP (Cyclic Prefix) have been examined as radio access methods for next generation mobile communication. It is well know that the OFDM method has robustness to frequency selective broadband radio channels.

The theory of the OFDM method will be explained below. FIG. 19 is a block diagram of a typical transmission station in the OFDM method. First, an error correction encoding unit 1 performs encoding of a data signal so that a receiver can execute error correction, a data modulation unit 2 performs data modulation, and a data/pilot signal multiplexing unit 3 performs time-division multiplexing of a data signal and a pilot signal that is known by the receiving station. Next, an IFFT unit 4 performs IFFT processing in unit of a set number of samples, and a CP insertion unit inserts a CP. The aforementioned set number of samples is called an OFDM symbol.

More specifically, as shown in FIG. 20, by copying $N_{CP}$ number of samples at the end of each of the OFDM symbols (=$N_{FFT}$ samples) after IFFT and inserting them at the start of each of the OFDM symbols, the CP serves the role as a guard interval for each of the OFDM symbols. Here, the CP is cyclically copied, so the signal continues for the interval of ($N_{FFT}+N_{CP}$) after the insertion of the CP. Next, a DA conversion unit 6 performs D/A conversion and a transmission RF unit performs orthogonal modulation, converts the baseband signal to a radio frequency signal and transmits that radio signal toward a receiving station 9 from a transmission antenna 8.

FIG. 21 is a block diagram of a typical receiving station in the OFDM method. A reception RF unit 10 converts the signal that is transmitted from the transmission station from a radio frequency signal to a baseband signal and performs orthogonal demodulation, after which an AD conversion unit 11 performs A/D conversion. A FFT timing detection unit 12 detects the reception timing of a direct wave by calculating the correlation between the received signal and a replica of the transmission pilot signal. A CP removal unit 13 removes the CP from the received signal based on the reception timing information, and extracts the effective signal component from each OFDM symbol.

FIG. 22 is an example showing the state of extracting the effective signal component. For convenience of explanation, the received signal is divided into and expressed as path components (direct wave, indirect wave), and ignoring the effects of thermal noise. It can be seen that only the effective signal component of OFDM symbol n after the CP has been removed is accurately extracted from the direct wave of path 1 and a signal component having part of the CP is extracted from the indirect wave (delay wave) of path 2. However, the CP is cyclically copied from the effective signal component of the OFDM symbol, so as a result only the effective signal component of OFDM symbol n is accurately extracted. In other words, multipath components having a delay time that is equal to or less than the CP length are received without interference occurring between OFDM signals.

A FFT unit 14 performs FFT on the signal after the CPs have been removed, and a data/pilot signal separation unit 15 separates the time-division multiplexed data signal and pilot signal from the received signal. A channel estimation unit 16 calculates the correlation between the received pilot signal and a replica of the transmitted pilot signal and estimates the channel distortion in the radio channel. On the other hand, a channel compensation unit 17 multiplies the received data signal by the complex conjugate of the channel estimation value to suppress channel distortion, a data demodulation unit 18 uses the compensated received signal to demodulate the received data, and an error correction decoding unit 19 performs error correction and decoding of the demodulated data.

Next, the frequency spectrum of a transmission signal in the OFDM method will be considered. FIG. 23 is an example of the frequency spectrum of the signal that is transmitted from the transmission station shown in FIG. 19. The horizontal axis is the frequency that has been normalized by the system bandwidth, and the vertical axis is the power that has been normalized by the transmission power at near the center frequency. In this example, the power on the outside of the effective subcarrier of the system bandwidth gradually converges, so the radiation at the adjacent band is large. This is due to the frame format of the OFDM method shown in FIG. 20. As was described above, in the signal after the CP is inserted, the signal continues inside one OFDM symbol (=$N_{FFT}+N_{CP}$ samples), however, the signal does not continue at the boundaries of each OFDM symbol. This means the signal is multiplied by a rectangular window function having the unit of an OFDM symbol, and thus the frequency spectrum has a waveform in which the Sinc function is convoluted, and the power converges gradually.

Multiplying the signal by a window function other than a rectangular window function so that the signal is gradually damped at the boundaries of the OFDM symbols is known as a method for reducing the adjacent band radiation. FIG. 24 shows the state of multiplying the signal after CP insertion (OFDM symbol A) by a window function. First, taking the interval during which the signal is damped by the window function to be $N_{win}$ samples, then $N_{win}/2$ samples that are cyclically copied at two locations of each OFDM symbol are inserted on both sides of the OFDM symbol A (see (A) and (B) of FIG. 24). The signal continues during the interval of ($N_{FFT}+N_{CP}+N_{win}$) samples after insertion. Next, each of the intervals of $N_{win}$ samples on both sides of this interval of ($N_{FFT}+N_{CP}+N_{win}$) samples is multiplied by a window function (see (C) of FIG. 24). Here, a raised cosine function is used as the window function. After that, the OFDM symbols are joined so that the intervals in which the signal is damped by the window function overlap each other between adjacent OFDM symbols (see (D) of FIG. 24). FIG. 25 shows the frequency spectrum of the transmission signal when multiplied by the time window of the raised cosine function. The signal is damped near the non-continuous points at the boundaries of the OFDM symbols, so the power converges more quickly than when the signal is multiplied by a rectangular time window.

In addition, it is also possible to reduce the adjacent band radiation by using a band pass filter having a precipitous frequency characteristic.

FIG. 26 shows the state in which the CP removal unit 13 of the receiving station extracts the effective signal component of each OFDM symbol from the received signal in the case where the signal is multiplied by the window function described above by the transmission station. As in the case shown in FIG. 22, when extracting signals using a typical extraction interval ITI in the OFDM method, only the effective signal component of the OFDM symbol n is accurately extracted from the indirect wave of path 2. However, in the direct wave of path 1, the effective signal component of the OFDM symbol n is distorted at the tail end Ttail of the extraction interval, and furthermore, a signal from the adjacent OFDM symbol (n+1) is mixed in as interference, so the final reception deteriorates.

In order to avoid this problem, the receiving station must extract the received signal so that it does not include the time window area. When the overall communication system is regulated so that common window function processing is performed by each transmission station, it is possible to easily decide the position for extracting the received signal by the receiving station by taking into consideration that common window function processing. However, in a case where just the upper limit value of the adjacent band radiation is regulated and the system is not regulated such that common window processing is performed, the designer appropriately selects a method for reducing the adjacent band radiation when designing the transmission station according to restrictions on the supported transmission speed and circuit scale. In this state, even when each of the transmission stations performs window function processing, it is feasible that the method for applying the time window, for example using a different window width, will differ. In that case, it is not possible to easily decide the position for extracting the received signal by the receiving station.

One method for solving this problem, regardless of whether or not window function processing is actually performed on the transmission signal, is to always shift the extraction interval forward by the receiving station as shown by the cut-out interval IT2 in FIG. 26 so that the time window area is not included in the extraction interval. However, when the extraction interval is shifted forward, an adverse effect occurs in that the substantial CP length becomes shorter, so even when the delay time of the signal in the delay path is short, inter-symbol interference occurs. Therefore, when the extraction interval is shifted forward for a transmission signal to which a time window has not actually been applied, the CP is not effectively used, so it cannot be said that the method of simply shifting the extraction interval forward is the best method.

A technique has been proposed in which in order to suppress discontinuity between symbols of the OFDM modulated signal, the amount of computation of window function processing is reduced (Refer to JP2003-3480421 A). In addition, an interference removal device has been proposed that determines whether or not the delay difference between a certain user and another user is equal to or greater than the window width of the time window, and removes the interference component (Refer to JP2003-347947 A). However, neither of these techniques extracts the effective symbol component from the received signal and performs demodulation so that the signal does not include the time window region.

SUMMARY OF THE INVENTION

Taking into consideration the problems described above, it is the object of the present invention to make it possible for a receiving station to effectively use a CP in an environment where there are both transmission stations that perform window function processing of a transmission signal and transmission stations that do not perform window function processing, and to be able to perform demodulation without receiving the distorting effect due to window function processing.

First Radio Communication Method

A first form of the present invention is a radio communication method in which a transmission station performs window function processing on a transmission signal to which cyclic prefixes have been attached for each specified number of samples, then transmits the signal, and a receiving station extracts and demodulates effective signal portions from the received signal, comprising: a step of notifying the receiving station of the window width $N_{win}$ of the window function using a control channel from the transmission station; a step of adjusting the extraction position of the received signal in the receiving station based on the window width notified from the transmission station; and a step of executing to demodulation processing of the transmission signal using the extracted received signal.

In this first radio communication method the step of adjusting the extraction position comprises a step of finding the timing of the start of the transmission signal, and deciding a period of said specified number of samples from that timing as a reception timing period, and a step of deciding a period obtained by returning the reception timing period back in time by $N_{win}/2$ as the extraction position of the effective signal portion. Moreover, the step of adjusting the extraction position comprises a step of adjusting the extraction position of the effective signal portion based on the modulation method of the transmission station, or delay spread of the radio channel.

Second Radio Communication Method

A second form of the present invention is a radio communication method in which each transmission station performs window function processing on a transmission signal to which cyclic prefixes have been attached for each specified number of samples, then transmits the signal, and a receiving station extracts effective signal portions from the received signal and demodulates the transmission signal from each transmission station, comprising: a step of notifying the receiving station of the window width $N_{win}$ of the window function using a control channel from each transmission station; a step of setting a reference reception timing at which the effective signal portion is extracted from the received signal in the receiving station; a step of setting a timing for each transmission station that is delayed from the reference reception timing according to the window width as a target reception timing; a step of measuring the difference between the actual reception timing of the transmission signal from each transmission station and the target reception timing of each transmission station, and notifying each transmission station of that difference; a step of adjusting the transmission timing so that the notified difference becomes zero in each transmission station; and a step of using the extracted received signal to demodulate the transmission signal from each transmission station.

In this second radio communication method, the step of setting the target reception timing comprises a step of setting a timing that is delayed by $N_{win}/2$ from the reference reception timing as the target reception timing of the transmission station. In addition, the step of setting the target reception timing comprises a step of adjusting the target reception timing based on the modulation method of the transmission station or delay spread of the radio channel.

Third Radio Communication Method

A third form of the present invention is a radio communication method in which each transmission station performs window function processing on a transmission signal to which cyclic prefixes have been attached for each specified number of samples, then transmits the signal, and a receiving station extracts effective signal portions from the received signal and demodulates the transmission signal from each transmission station, comprising: a step of setting in the receiving station a reference reception timing at which the effective signal portion is extracted from the received signal; a step of measuring difference $\delta T_i$ between the actual reception timing of the transmission signal from each transmission station and the reference reception timing, and notifying each transmission station of that difference; a step of using the difference $\delta T_i$ and window width $N_{win}$ of the window function to adjust the transmission timing of the transmission signal in the transmission station; and a step of using the extracted received signal to demodulate the signal transmitted from each transmission station.

The transmission timing adjustment step of this third radio communication system comprises a step of quickening the transmission timing of the transmission signal by $(\delta T - N_{win}/2)$. Moreover, the transmission timing adjustment step comprises a step of adjusting the transmission timing based on the modulation method of the transmission station or delay spread of the radio channel.

Transmission Station and Receiving Station in a Radio Communication System

A fourth form of the present invention is the transmission station and receiving station of the radio communication system that realizes the first to third radio communication methods described above.

The transmission station in a radio communication system that realizes the first radio communication method comprises: a CP attachment unit that attaches cyclic prefixes (CP) to a transmission signal for each specified number of samples; a window function processing unit that performs window function processing on the transmission signal to which the cyclic prefixes have been attached; and a transmission unit that transmits the window width of the window function to a receiving station by a control channel; and the receiving station comprises: a receiving unit that receives a signal that is transmitted from the transmission station; a control signal demodulation unit that demodulates the window width $N_{win}$ of the window function that is transmitted from the transmission station by a control channel; a signal extraction position decision unit that decides a position for extracting the effective signal portion from the received signal based on the window width; a signal extraction unit that extracts the effective signal portion from the received signal at the extraction position; and a demodulation unit that uses the extracted received signal to demodulate the transmission signal.

The receiving station in a radio communication system that realizes the second radio communication method comprises: a receiving unit that receives a signal that is transmitted from each transmission station; a control signal demodulation unit that demodulates the window width $N_{win}$ of the window function that is transmitted from each transmission station by a control channel; a reference reception timing setting unit that sets a reference reception timing for extracting the effective signal portion from the received signal; a target reception timing setting unit that sets a timing for each transmission station that is delayed from the reference reception timing according to the window width as a target reception timing; a timing difference measurement unit that measures the difference between the actual reception timing of a transmission signal from each transmission station and the target reception timing of each transmission station; a difference transmission unit that notifies each transmission station of the timing difference in order that the transmission station can adjust the transmission timing so that the difference becomes zero; and a demodulation unit that uses the extracted received signal to execute demodulation processing of the transmission signal from each transmission station.

The transmission station in a radio communication system that realizes the third radio communication method comprises: a CP attachment unit that attaches cyclic prefixes (CP) to a transmission signal for each specified number of samples; a window function processing unit that performs window function processing of the transmission signal to which the cyclic prefixes have been attached; a transmission unit that transmits the signal for which the window function processing has been performed; a receiving unit that receives from the receiving station, difference $\delta T_i$ between a reference reception timing at which the effective signal portion is extracted from a received transmission signal and an actual reception timing of the transmission signal; and a transmission timing adjustment unit that uses the difference $\delta T_i$ and the window width $N_{win}$ of the window function to adjust the transmission timing of the transmission signal.

DESCRIPTION OF THE PREFERRED EMBODIMENTS

(A) First Embodiment

(a) Transmission Station

In a first embodiment of the invention, the case will be explained for a digital mobile communication system that uses the OFDM method in which a receiving station receives from a transmission station a signal for which window function processing has been performed, and demodulates that signal.

Figure 1:
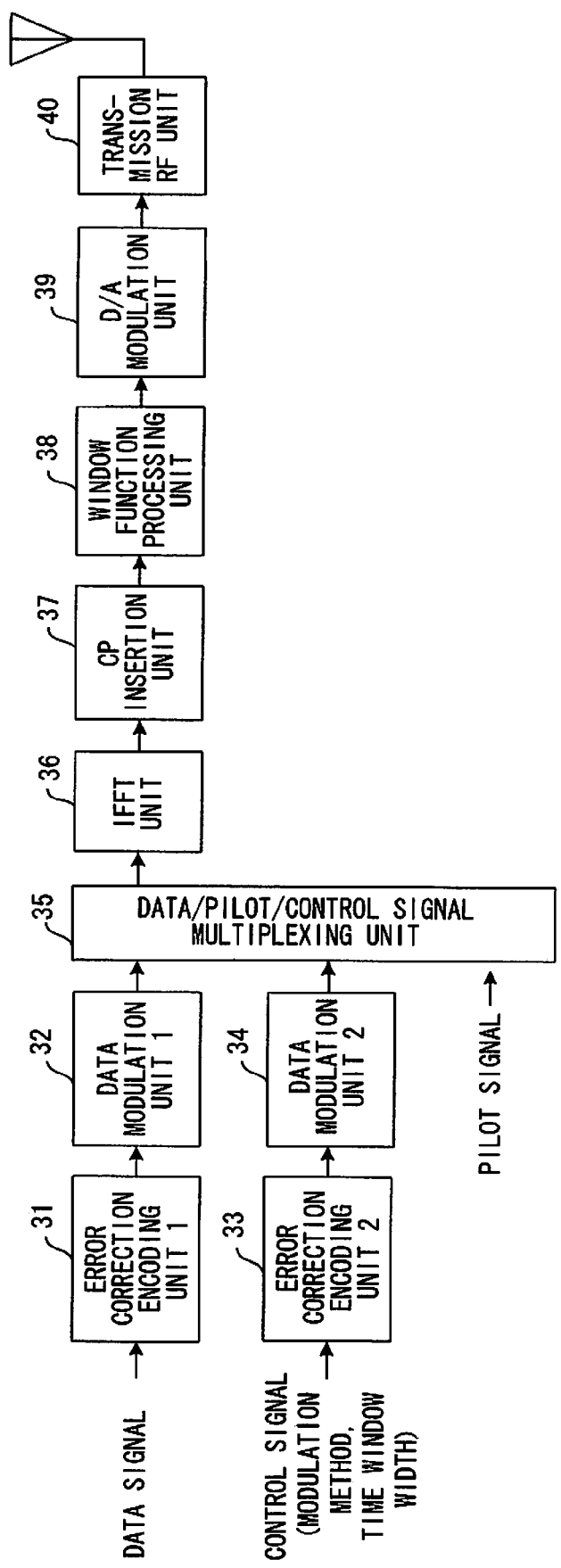
FIG. 1 is a block diagram of a transmission station of a first embodiment of the invention.

FIG. 1 is a block diagram of a transmission station of a first embodiment of the invention.

An error correction encoding unit 31 performs encoding of a data signal so that a receiver can perform error correction, and a data modulation unit 32 performs data modulation (for example, QPSK modulation) of the encoded data signal. On the other hand, an error correction encoding unit 33 performs data encoding of a control signal that includes information that indicates the window width of a window function processing that is applied by a window function multiplication unit (described later) and the data modulation method used, and a data modulation unit 34 performs data modulation (for example, QPSK modulation) on the encoded signal.

Figure 2:
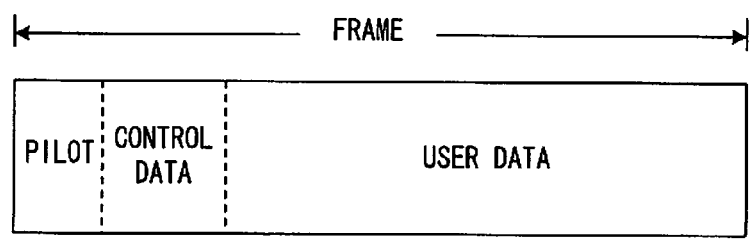
FIG. 2 is a drawing for explaining the OFDM frame format.

A data/pilot/control signal multiplexing unit 35 performs time-division multiplexing of a data signal, control signal and a pilot signal that is known by the receiving station. FIG. 2 is a drawing for explaining the OFDM frame format, where one frame comprises a plurality of OFDM symbols, for example 32 OFDM symbols, that are time-division multiplexed from the start in the order pilot symbols, control data symbols and user data symbols, and then transmitted.

An IFFT unit 36 performs IFFT processing using a unit of a set number N of samples (OFDM symbol unit). In other words, N number of samples are taken to be N number of subcarrier signal components, and the IFFT unit 36 performs IFFT processing on the subcarrier components to convert the signal to a discrete time signal and outputs the result. A CP insertion unit 37 inserts CPs in OFDM symbol units, a window function processing unit 38 multiplies the signal after CP insertion by a window function, a DA conversion unit 39 performs D/A conversion of the signal that has undergone window function processing to convert the signal to an analog signal, and a transmission RF unit 40 performs orthogonal modulation of the input signal, then performs frequency UP conversion to convert the obtained baseband signal to a radio signal and transmits that radio signal from a transmission antenna.

Figure 3:
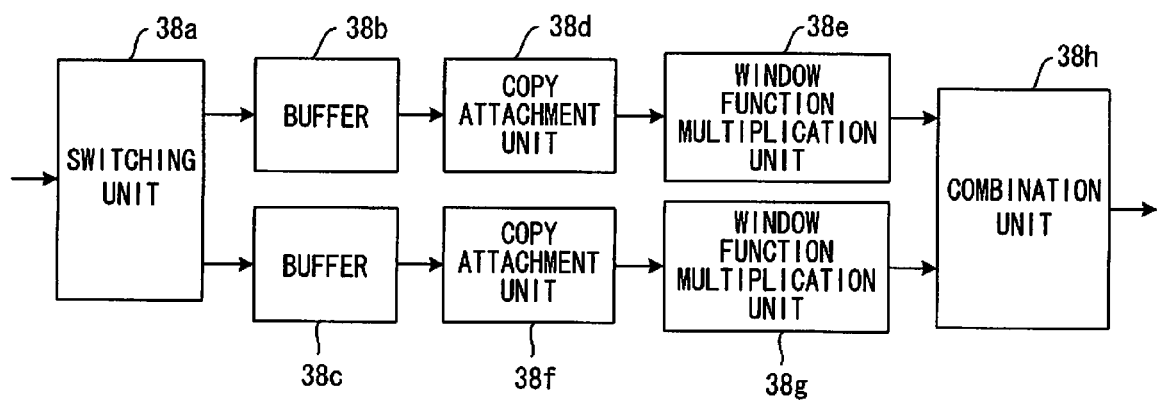
FIG. 3 is a drawing showing the construction of a window function processing unit.

The window function processing unit 38 performs window function processing of the transmission signal after CP insertion. FIG. 3 is a drawing showing the construction of the window function processing unit 38, and FIG. 4 is a drawing for explaining the window function process.

Figure 4:
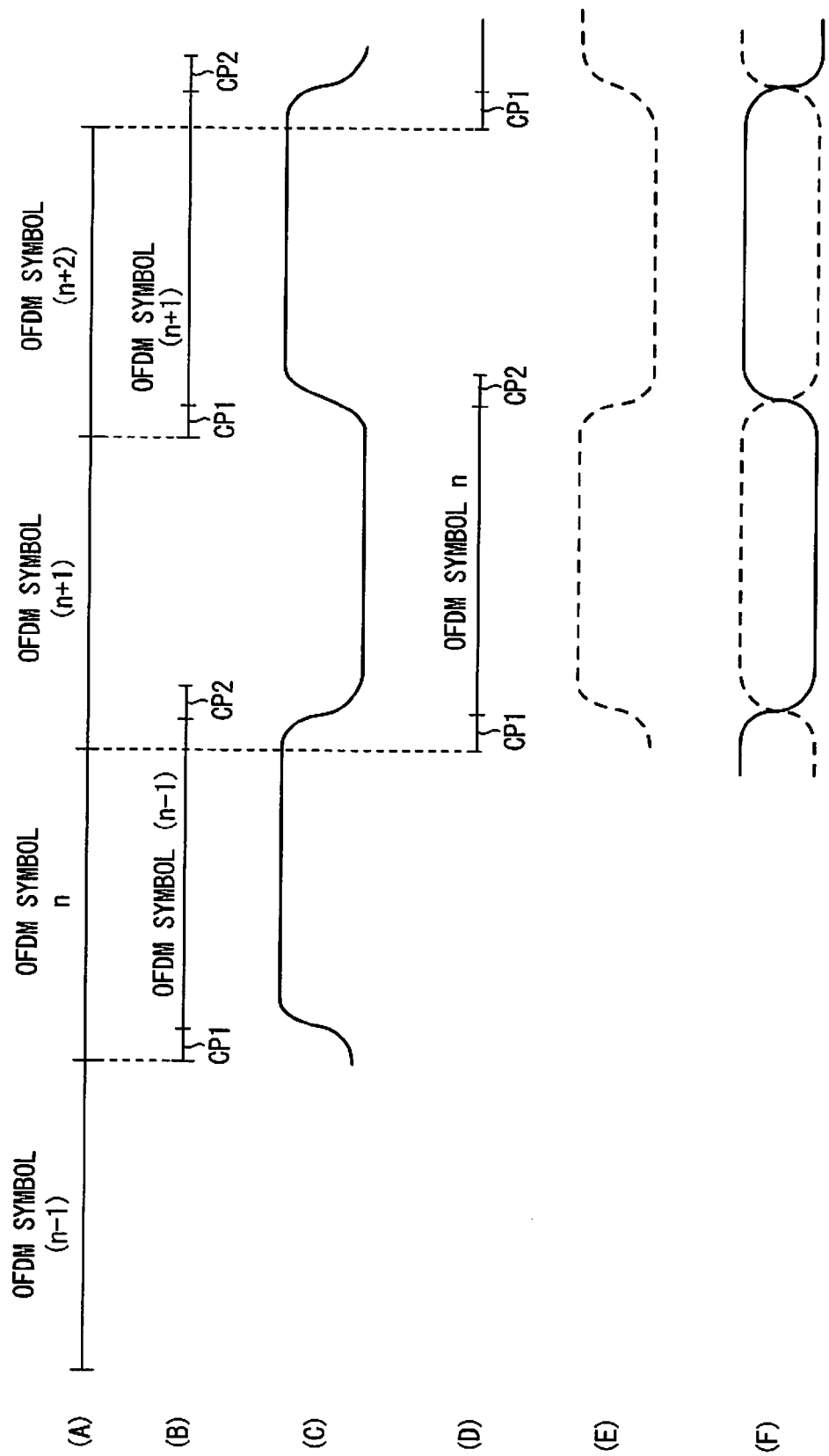
FIG. 4 is a drawing for explaining the window function process.

A switching unit 38a alternately inputs the OFDM symbols (n−1), n, (n+1), (n+2), . . . that were input from the CP insertion unit to a first and second buffer 38b, 38c (see (A) of FIG. 4). In other words, OFDM symbols (n−1) and (n+1) are input to the first buffer 38b, and OFDM symbols n and (n+2) are input to the second buffer 38c. After the OFDM symbol (n−1) has been stored in the first buffer 38b, a first copy attachment unit 38d copies $N_{win}/2$ number of samples CP1, CP2 from two locations of the OFDM symbol (n−1) to both sides of the OFDM symbol (see (B) of FIG. 4). A first window function multiplication unit 38e multiplies both the front and rear of the OFDM symbol to which the copies CP1, CP2 have been attached by a window function having a window width $N_{win}$ (see (C) of FIG. 4). After the OFDM symbol n has been stored in the second buffer 38c, a second copy attachment unit 38f copies $N_{win}/2$ number of samples CP1, CP2 from two locations of the OFDM symbol n to both sides of the OFDM symbol (see (D) of FIG. 4). A second window function multiplication unit 38g multiplies both the front and rear of the OFDM symbol to which the copies CP1, CP2 have been attached by a window function having a window width $N_{win}$ (see (E) of FIG. 4).

A combination unit 38h combines the OFDM symbols that have been multiplied by the window function and output from the first and second window function multiplication units 38e, 38g, and outputs the result (see (F) of FIG. 4). After that, the same window function processing is performed when the OFDM symbols (n+1) and (n+2) are stored in the first and second buffers 38b, 38c.

(b) Receiving Station

Figure 5:
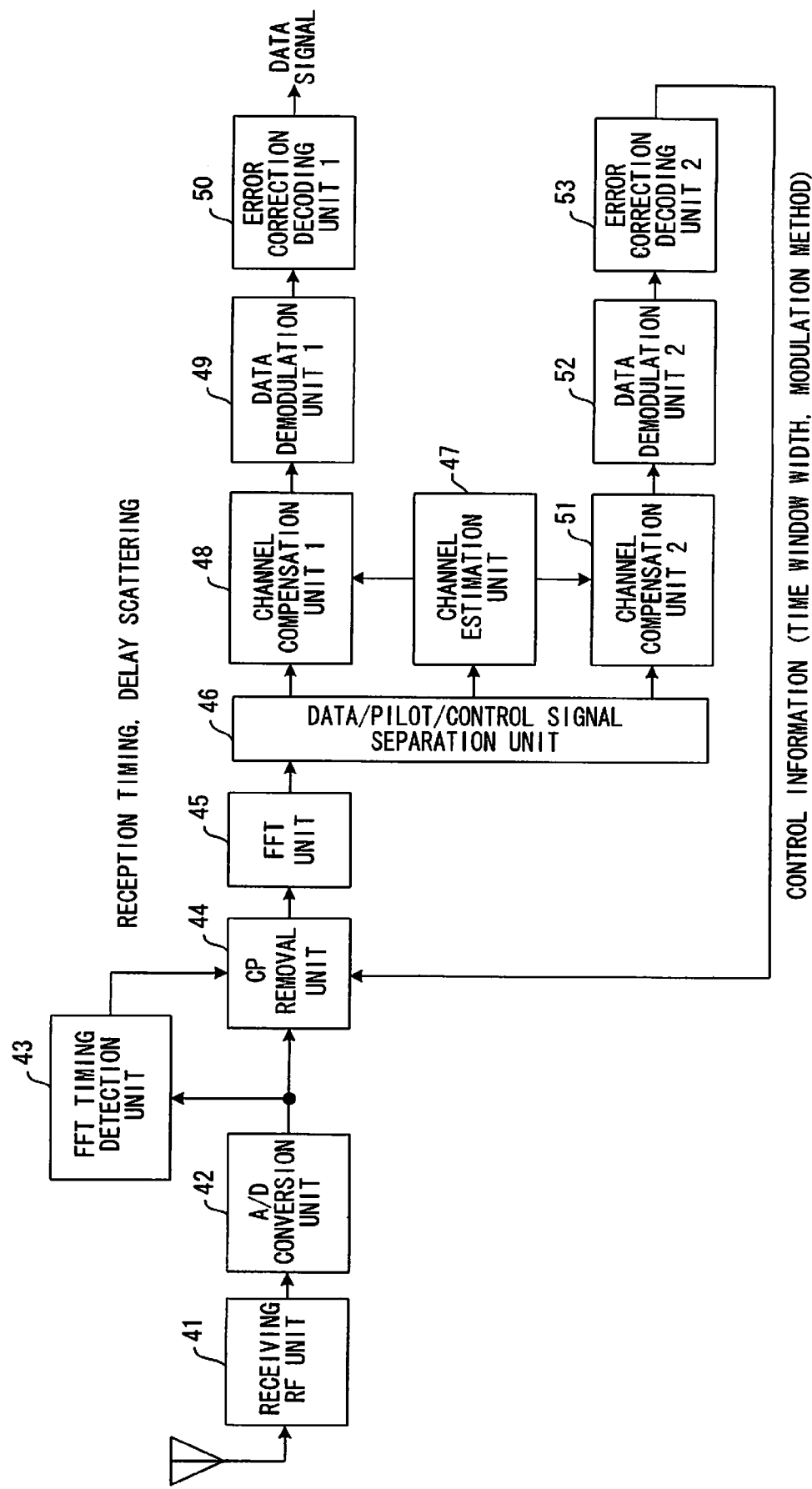
FIG. 5 is a block diagram of a receiving station of a first embodiment of the invention.

FIG. 5 is a block diagram of a receiving station of a first embodiment of the invention.

A receiving RF unit 41 receives a radio signal that is transmitted from a transmission station, performs frequency DOWN conversion of the radio signal to a baseband signal, and performs orthogonal demodulation on that baseband signal. An AD conversion unit 42 performs A/D conversion of the signal obtained after orthogonal demodulation to convert the signal to a digital signal. By calculating the correlation between the received signal and a replica of the transmitted pilot signal, a FFT timing detection unit 43 detects the reception timing of the signal waves (direct wave, indirect wave) that are received by each path of multiple paths, and finds the delay spread D of the radio channel.

Figure 6:
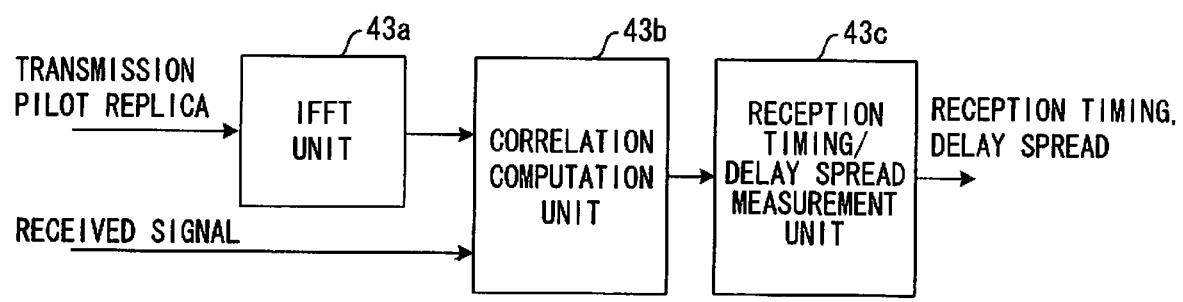
FIG. 6 is a drawing showing the construction of a FFT timing detection unit.
Figure 7:
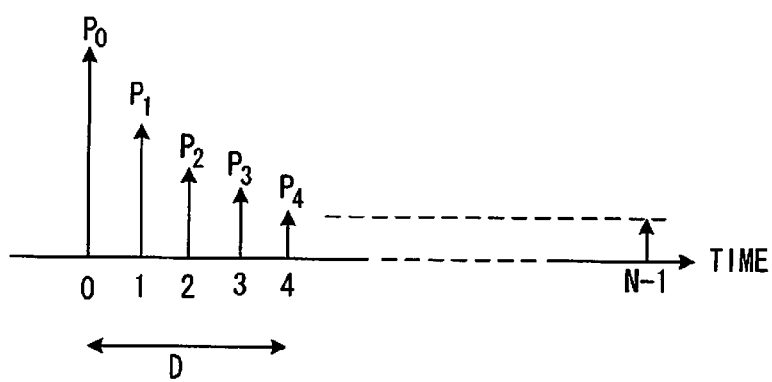
FIG. 7 is a drawing for explaining reception timing and delay spread D.

FIG. 6 is a drawing of the construction of the FFT timing detection unit 43, and FIG. 7 is a drawing for explaining the reception timing and delay spread D. An IFFT unit 43a performs IFFT processing on a replica of a pilot signal that is transmitted from a transmission station, and generates pilot signals that are continuous in time, then a correlation computation unit 43b calculates the correlation between the pilot signal and the received signal. As shown in FIG. 7, from this correlation calculation, peak values are obtained at the reception timing of each path $P_0$ to $P_4$ of multiple paths. Here, the reception timing is the timing that the start of an OFDM symbol of a signal wave arrives via a path. The direct wave is the earliest to arrive, so the direct wave from path $P_0$ arrives, then indirect waves (delay waves) from other paths arrive. The period from the reception timing of path $P_0$ until the reception timing of a last path of which level is equal to or greater than a specified threshold level is the delay spread D.

A reception timing/delay spread measurement unit 43c measures and outputs the reception timing an delay spread D.

Figure 8:
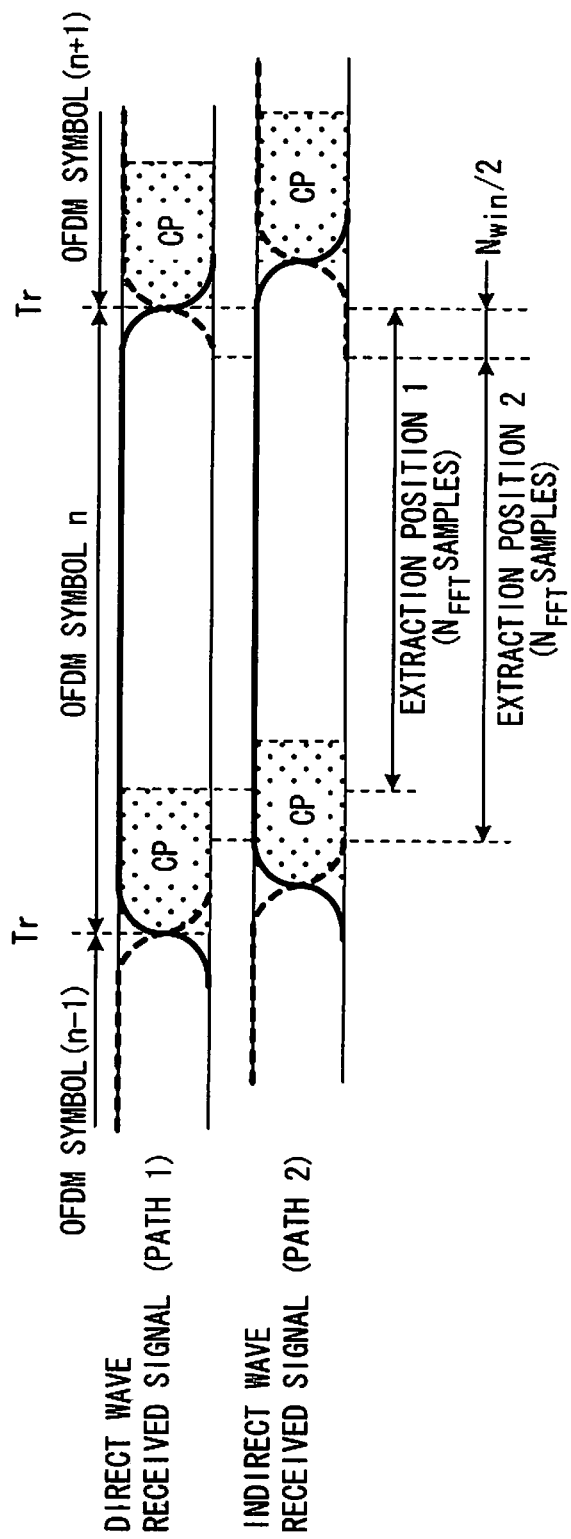
FIG. 8 is a drawing for explaining the extraction of effective signal components.

Based on the reception timing information of the direct wave that arrives via path $P_0$, the delay spread D, the window width of the window function that is obtained from the control information (described later), and information about the modulation method of the data channel, a CP removal unit 44 extracts the effective signal components of each of the OFDM symbols from the reception signal. FIG. 8 is a drawing for explaining the extraction of effective signal components. In the present invention, by taking the width of the window function to be $N_{win}$, the extraction position of the received signal is shifted forward (direction going back in time) by $N_{win}/2$ with respect to the typical extraction position 1 in the OFDM method. In other words, the extraction position of the received signal of the present invention is extraction position 2.

At this extraction position 2, a distortion component that occurs due to the window function processing, or interference component from adjacent OFDM symbols are not included in the extracted received signal (direct wave, indirect wave), so it is possible to prevent deterioration of the reception. Moreover, the amount of shifting the extraction position is kept to a minimum, so it is possible for the CP to be effectively used. Information about the window width $N_{win}$ of the window function is not obtained only at the beginning of communication, so the received signal is extracted at extraction position 1.

Figure 9:
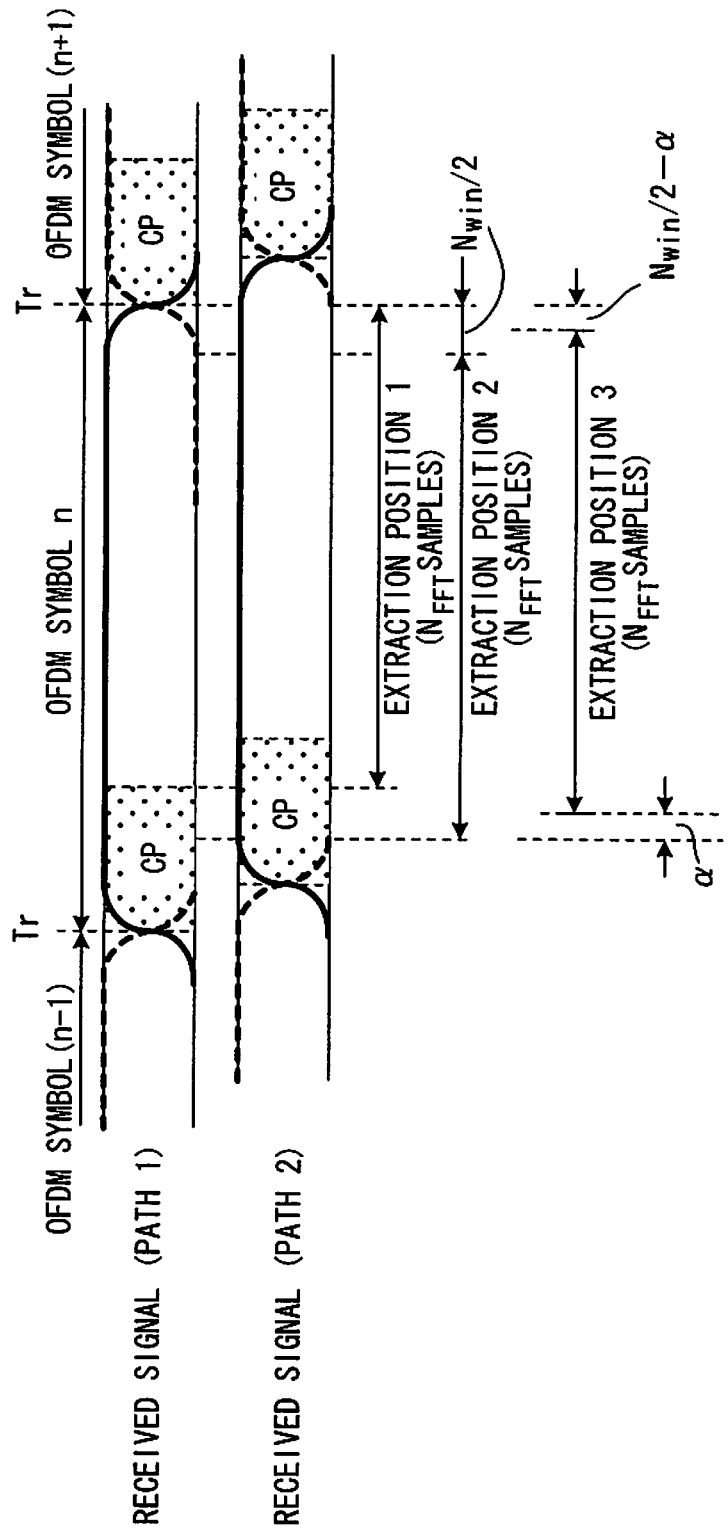
FIG. 9 is another drawing for explaining the extraction of effective signal components.

The causes of the deterioration of reception related to the extraction position of the received signal are distortion of the OFDM symbols that are demodulated, that occurs due to the window function processing and symbol interference from paths having a large delay time. Taking into consideration the effects of these causes of deterioration, the extraction position of the received signal is further adjusted from the extraction position 2 to the extraction position 3 as shown in FIG. 9 based on the delay spread D and modulation method for the data channel in order to prevent the deterioration of the reception. For example, when the delay spread D exceeds a specified threshold value, preventing symbol interference from paths having a large delay time takes precedence and the extraction position of the received signal is changed to the extraction position 3 by shifting the position backward from the extraction position 2 by a set amount α. By doing this, the substantial CP length increases, which improves the resistance to interference from adjacent OFDM symbols. In addition, when the modulation method for the data channel is QPSK, the effect from the distortion that occurs due to window function processing becomes comparatively small, so the extraction position of the received signal is changed to the extraction position 3 by shifting the position backward from the extraction position 2 by a set amount α. By doing this, the substantial CP length can be increased while maintaining the reception characteristics.

Figure 10:
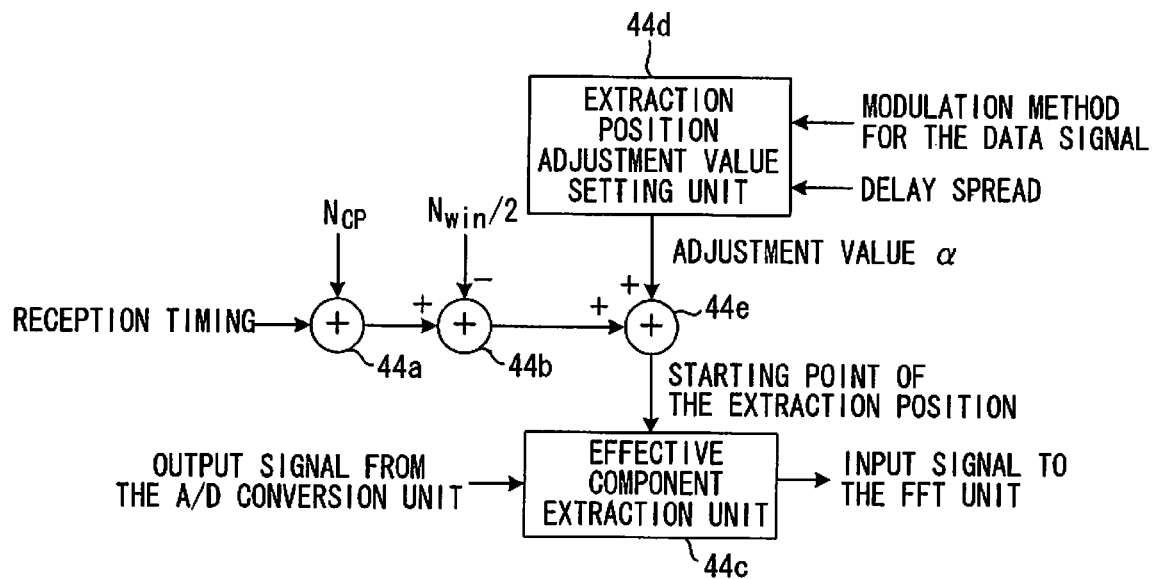
FIG. 10 is a drawing showing the construction of a CP removal unit.

FIG. 10 is a drawing of the construction of the CP removal unit 44. An adder 44a adds the CP length Tcp to the timing of the start of an OFDM symbol (reception timing) Tr to generate the start timing of extraction position 1 (see FIG. 8), and an adder 44b subtracts $N_{win}/2$ from the start timing of extraction position 1 to generate the start timing of extraction position 2. When the extraction position is not to be adjusted based on the delay spread D or modulation method used for the data channel, an effective component extraction unit 44c extracts $N_{FFT}$ samples from the start timing of extraction position 2 that is output from the adder 44b and inputs those samples to an FFT unit 45 later on. However, when the extraction position is to be adjusted based on the delay spread D or modulation method used for the data channel, an extraction position adjustment value setting unit 44d generates an extraction position adjustment value α that corresponds with whether the delay spread D is greater than a threshold value, or whether the modulation method is QPSK, and an adder 44e adds that value α to the start timing of extraction position 2 to generate the start timing for an extraction position 3 (see FIG. 9). The effective component extraction unit 44c extracts $N_{FFT}$ samples from the start timing of extraction position 3 that is output from the adder 44e and inputs it to an FFT unit 45 later on.

Returning to FIG. 5, an FFT unit 45 performs FFT processing on the signal after CP removal, and a data/pilot/control signal separation unit 46 separates the time-division multiplexed data signal, control signal and pilot signal from the received signal. A channel estimation unit 47 estimates the channel distortion in the radio channel by calculating the correlation between the received pilot signal and a replica of the transmitted pilot signal. A channel compensation unit 48 for data suppresses the channel distortion in the data signal by multiplying the received data signal by the complex conjugate of the channel estimation value, then a data demodulation unit 49 performs demodulation processing on that channel-compensated data signal to demodulate the data, and an error correction decoding unit 50 performs error correction and decoding of the demodulated data and outputs the result.

Moreover, a channel compensation unit 51 for control information suppresses channel distortion of the control signal by multiplying the received control signal by the complex conjugate of the channel estimation value, then a data demodulation unit 52 performs demodulation processing on that channel-compensated data signal to demodulate the data, and an error correction decoding unit 53 performs error correction and decoding of the demodulated data and outputs the result. This control signal includes the window width $N_{win}$ of the window function, and information about the modulation method for the data signal, so this information is input to the CP removal unit 44. The CP removal unit 44 uses the window width $N_{win}$ and the modulation method for the data signal to decide the extraction position, then extracts the $N_{FFT}$ samples of the effective signal component (effective OFDM symbol portion) from the extraction position and inputs the result to the FFT unit.

With this first embodiment of the invention, the distorted components that occur due to window function processing, and components that have received the effect of interference from adjacent OFDM symbols (see FIG. 8 and FIG. 9) are not contained in the extracted signal, thus the receiving station can effectively use CP and execute demodulation of transmission symbols without receiving the effect of distortion from window function processing.

In the embodiment described above, an example was explained in which the OFDM method was used, however, the present invention can also be applied to other transmission methods (SC-FDE: Single Carrier-Frequency Domain Equalizer) in which FFT and CP are used.

(B) Second Embodiment (a) Theory

Figure 11:
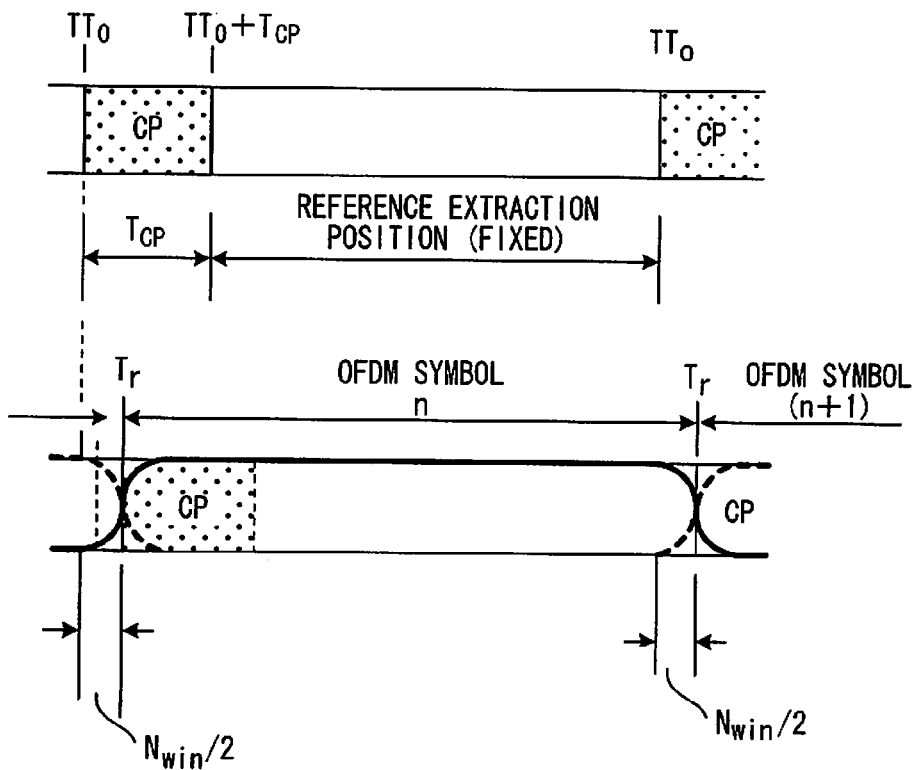
FIG. 11 is a drawing for explaining the theory of a second embodiment of the invention.

FIG. 11 is a drawing showing the theory of a second embodiment of the invention. In the first embodiment, the reception timing Tr (see FIG. 8) was detected and the extraction position 2 of the effective signal component was shifted by $N_{win}/2$ forward from the reception timing. In this second embodiment of the invention, the extraction position of the effective signal component (called the reference extraction position) is fixed, and the reception timing is controlled such that it is shifted by $N_{win}/2$ backward from the reference extraction position.

In other words, in this second embodiment, as shown in FIG. 11, reference target reception timing $TT_0$ is set, and the start of the extraction position of the effective signal component is fixed at a position after the CP period $T_{cp}$ from that timing $TT_0$. Moreover, the actual reception timing $T_r$ is controlled so that the positional relationship between the reference extraction position and the actual reception timing $T_r$ becomes the same as the positional relationship between the extraction position 2 and the reception timing $T_r$ shown in FIG. 8. That is, the transmission timing at the transmission station is controlled so that the position $(TT_0+N_{win}/2)$ that is delayed by $N_{win}/2$ from the reference target reception timing $TT_0$ $(TT_0+N_{win}/2)$ coincides with the actual reception timing $T_r$.

(b) Transmission Station

Figure 12:
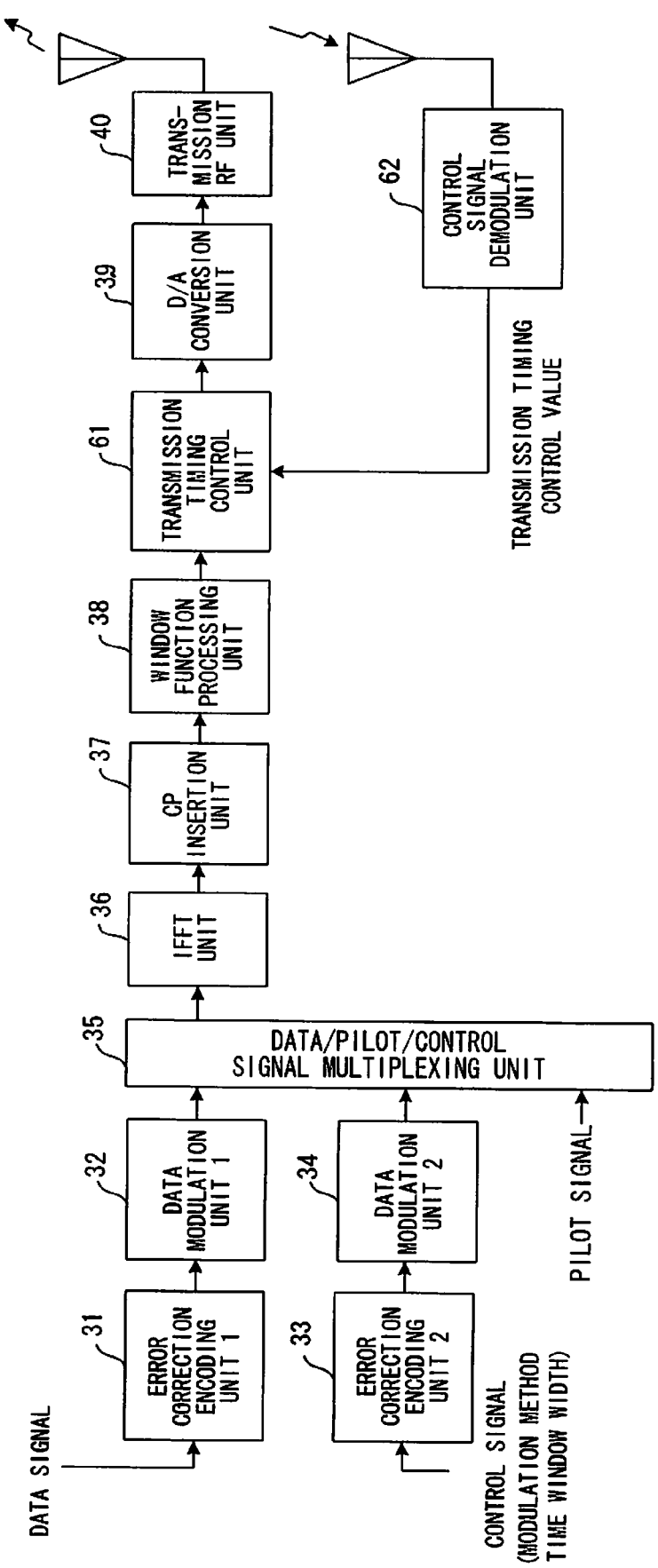
FIG. 12 is a block diagram of a transmission station of a second embodiment of the invention.

FIG. 12 is a block diagram of a transmission station of a second embodiment of the invention, where the same reference numbers are given to parts that are the same as those of the transmission station of the first embodiment shown in FIG. 1. This embodiment differs in that a transmission timing control unit 61 and a control signal demodulation unit 62 that demodulates the control signal (transmission timing control value) that is sent from the receiving station are provided. Differing from the first embodiment, in this second embodiment, the receiving station receives and demodulates signals from a plurality of transmission stations at the same time.

In the case of applying a transmission method such as the OFDM method that uses FFT and CP to an UP link from a mobile station to a base station, it is necessary to prevent interference between transmission stations, which are mobile stations, and in order to do that, the receiving station must receive the signals from each of the transmission stations at the target reception timing. Therefore, the receiving station measures the time difference between the target value (target reception timing) for the reception timing of the direct waves from each of the transmission stations and the actual reception timing, and each of the transmission stations controls the transmission timing of the transmission signal so that the time difference becomes zero.

In other words, a transmission station of this second embodiment performs processing up to the processing of the window function processing unit 38 the same as in the first embodiment. Then a control signal demodulation unit 62 demodulates the control signal that was fed back from the receiving station, extracts the transmission timing control value that is contained in that control signal, and inputs that value to a transmission timing control unit 61. This transmission timing control value is the time difference between the actual reception timing at the receiving station and the target reception timing.

At specified timing, the transmission timing control unit 61 transfers the signal one radio frame whose time width is $T_{frame}$ after multiplication by the window function to the D/A conversion unit 39. This transfer timing is decided based on the transmission timing control value. The method of deciding the transfer timing is as follows. When transmission timing control is not performed, the starting time for transferring frame n is $T_{frame}$ after the starting time for transferring frame (n−1). On the other hand, when the transmission control value gives an instruction to speed up the $\Delta T$ time, the starting time for transferring frame n becomes $(T_{frame}-\Delta T)$ after the starting time for transferring frame (n−1).

Next, the D/A conversion unit 39 and transmission RF unit 40 perform the same processing on the signal that was transferred from the transmission timing control unit 61 as was performed in the first embodiment, and transmit the signal from the transmission antenna.

(c) Receiving Station

Figure 13:
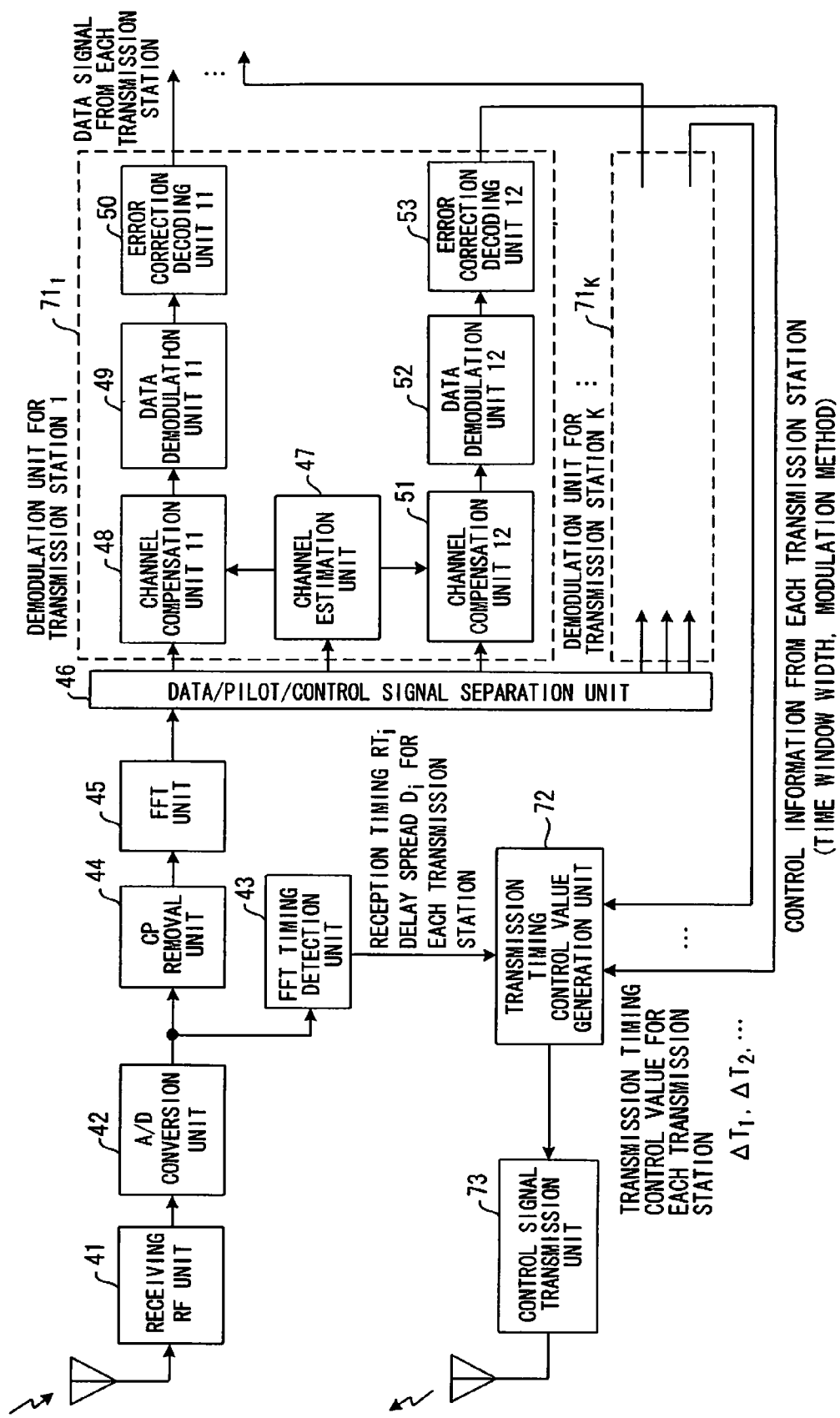
FIG. 13 is a drawing showing the construction of a receiving station of a second embodiment of the invention.

FIG. 13 is a drawing showing the construction of a receiving station of this second embodiment of the invention, where the same reference numbers are given to parts that are the same as those of the receiving station of the first embodiment shown in FIG. 5.

The receiving station performs the same processing up to that of the A/D conversion unit 42 as was performed in the first embodiment. As in the case of the first embodiment, the FFT timing detection unit 43 calculates the correlation between the received signal and a replica of the transmission pilot signal for each transmission station, detects the reception timing of signals that arrive via multiple paths from each of the transmission stations, and using that, finds the reception timing $RT_i$ of the direct waves and the delay spread Di of the radio channels.

A CP removal unit 44 extracts the effective signal components of each OFDM from the multiplexed signals received from the transmission stations at the reference extraction position shown in FIG. 11. A FFT unit 45 performs FFT processing on the signals after CP removal, and a data/pilot/control signal separation unit 46 separates the frequency-division multiplexed or code-division multiplexed data signals, control signals and pilot signals from the received signals from each of the transmission stations and inputs them to demodulation units $71_1$ to $71_K$ corresponding to the transmission stations. The demodulation units $71_1$ to $71_K$ that correspond to the transmission stations have the same construction, and together with performing the same demodulation processing as was performed in the first embodiment and outputting the data signals that were transmitted from each transmission station, input control information (window width of the window function, data modulation method, etc.) that was transmitted from each of the transmission stations to a transmission timing control value generation unit 72.

The transmission timing control value generation unit 72 uses the reference target reception timing $TT_0$ (see FIG. 11), window width $N_{win}$, delay spread $D_i$ and data modulation method to decide the target reception timing $TT_1, TT_2, \ldots$ for each of the transmission stations, then measures the time difference between each respective target reception timing $TT_1, TT_2, \ldots$ and actual reception timing $RT_1, RT_2, \ldots$, and outputs the time difference values as transmission control values.

Figure 14:
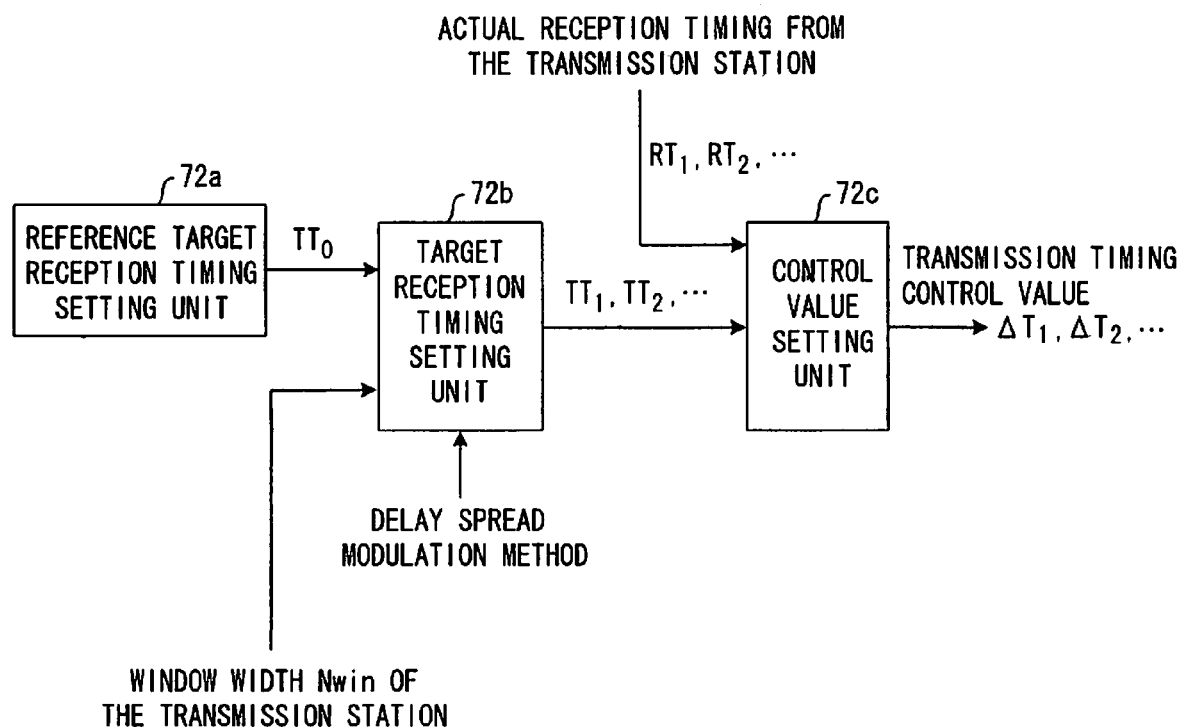
FIG. 14 is a drawing showing the construction of a transmission timing control value generation unit.
Figure 15:
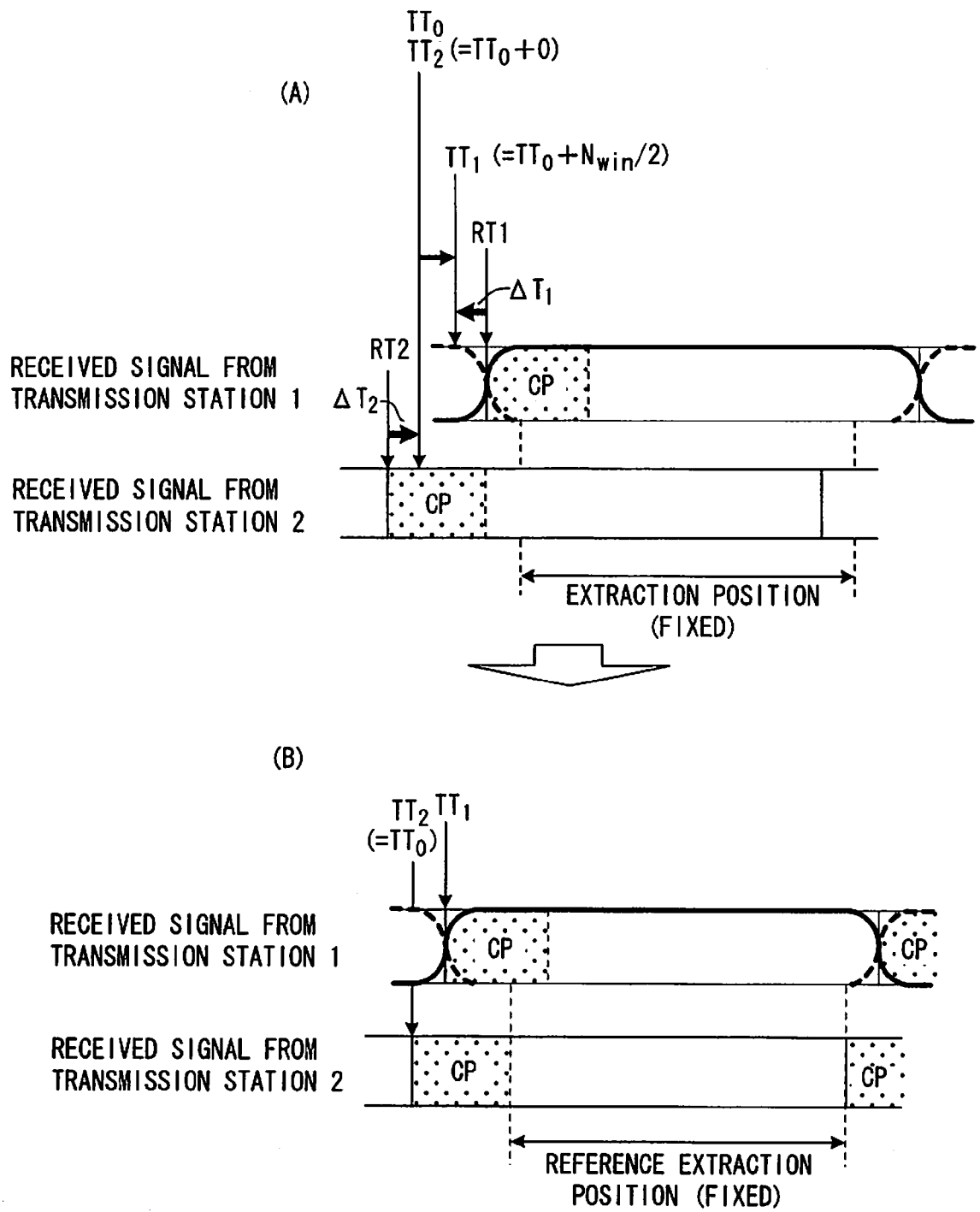
FIG. 15 is a drawing for explaining the generation of a transmission timing control value.

FIG. 14 is a drawing of the construction of the transmission timing control value generation unit 72, and FIG. 15 is a drawing for explaining the generation of transmission timing control values. A reference target reception timing setting unit 72a sets a common reference target reception timing $TT_0$ for each transmission station, and with that reference target reception timing $TT_0$ as a reference, a target reception timing setting unit 72b individually sets the respective target reception timing $TT_1, TT_2, \ldots$ (see (A) of FIG. 15) for each of the transmission stations. Taking the update period for transmission timing control to be $N_{itv}$ frames, and the reference target reception timing of frame (n−$N_{itv}$) to be $TT_0$(n−$N_{itv}$), the reference target reception timing $TT_0(n)$ of frame n can be calculated from the equation shown below.

$$TT_0(n)=TT_0(n-N_{itv})+N_{itv} \times T_{frame} \quad (1)$$

Next, the target reception timing setting unit 72b sets the target reception timing $TT_1, TT_2, \ldots$ for each transmission station based on the window width for each transmission station and the reference target reception timing $TT_0$. For example, supposing that at transmission station 1 the signal is multiplied by a window function have a window width $N_{win1}$, and that at transmission station 2 the signal is not multiplied by a window function, the respective target reception timing values $TT_1, TT_2$ for the transmission stations 1, 2 are calculated from the following equations.

$$TT_1=TT_0+N_{win}/2 \quad (2)$$

$$TT_2=TT_0 \quad (3)$$

Finally, a control value setting unit 72c finds respective transmission timing control values from the time differences between the target reception timing values $TT_1, TT_2, \ldots$ and actual reception timing values $RT_1, RT_2, \ldots$. For example, for transmission station 1, the actual reception timing $RT_1$ is delayed from the target reception timing $TT_1$ by $\Delta T_1$ (=$RT_1$-$TT_1$), so $\Delta T_1$ is taken to be the transmission timing control value. For transmission station 2, the transmission timing control value is found to be $\Delta T_2$ (=$RT_2$-$TT_2$) by the same method.

Returning to FIG. 13, a control signal transmission unit 73 performs modulation processing on the transmission timing control values $\Delta Ti$ for each of the transmission stations that were calculated by the transmission timing control value generation unit 72, and transmits the results to the respective transmission stations. Each transmission timing control unit 61 of each transmission station controls the transmission timing based on the transmission control value so that the timing difference $\Delta T1, \Delta T2, \ldots$ becomes zero.

When the transmission timing described above converges, the received signal from transmission station 1 that has been multiplied by a window function, and the received signal from transmission station 2 that has not been multiplied by a window function are extracted at the reference extraction position shown in (B) of FIG. 15. A distortion component that is caused due to the window function processing and an inter-symbol interference component are not included in the received signals that are extracted in this way, so it is possible to prevent deterioration of the reception. Moreover, it is possible to keep the amount of shifting of the extraction position to a minimum, so CP can be used effectively.

In the explanation above, the target reception timing values $TT_1, TT_2, \ldots$ were decided based on the reference target reception timing $TT_0$ and the window width $N_{win}$, however, it is possible to adjust the target reception timing values based on the delay spread or the modulation method for the data channel. For example, when the delay spread $D_i$ exceeds a specified threshold value, preventing the symbol interference from paths having a large delay time takes precedence, and the target reception timing $TT_1$ is decided by the following equation.

$$TT_1=TT_0+N_{win}/2-\alpha_{DS} \quad (4)$$

When the target reception timing is decided in this way, the extraction position of the received signal is shifted backward $\alpha_{DS}$ at the instant when the transmission timing control converges, so the substantial CP length becomes larger and the tolerance to the interference from adjacent OFDM symbols improves.

Moreover, when the modulation method for the data channel is QPSK, the effect due to distortion that occurs from window function processing is comparatively small, so the target reception timing $TT_1$ is set by the following equation.

$$TT_1=TT_0+N_{win}/2-\alpha_{QPSK} \quad (5)$$

When the target reception timing value is decided in this way, the extraction position of the received signal is shifted backward $\alpha_{QPSK}$ at the instant when the transmission timing control converges, so the substantial CP length becomes larger while maintaining good reception characteristics, and the tolerance to the interference from adjacent OFDM symbols improves.

With this second embodiment, a distortion component that occurs due to window function processing, and a component that received interference from adjacent OFDM symbols are not contained in the received signal. Therefore, with the present invention, the receiving station can effectively use CP and execute demodulation processing of transmission symbols without receiving the effect of distortion from window function processing.

(C) Third Embodiment

(a) Theory

Figure 16:
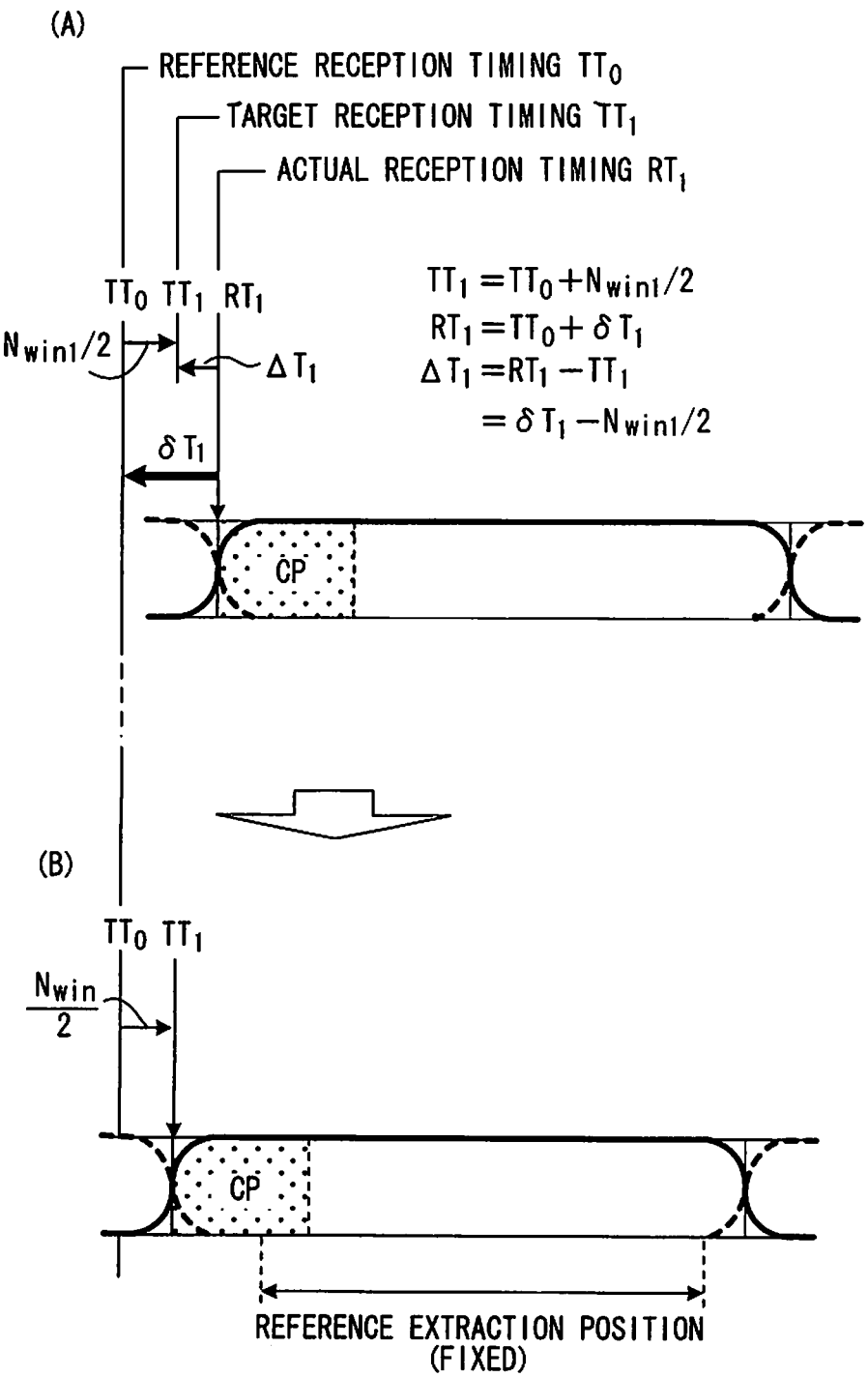
FIG. 16 is a drawing for explaining the theory of a third embodiment of the invention.

FIG. 16 is a drawing for explaining the theory of a third embodiment of the present invention.

In the second embodiment, the receiving station calculates the time difference $\Delta T_1$ (=$RT_1$-$TT_1$) between a target reception timing $TT_1$ and actual reception timing $RT_1$, and sends that time difference $\Delta T_1$ to the transmission station as a transmission timing control value, then the transmission station controls the transmission timing so that $\Delta T_1$ becomes zero. In this third embodiment, the transmission station calculates the transmission control value $\Delta T_1$ itself, and controls the transmission timing so that $\Delta T_1$ becomes zero. However, the receiving station measures the time difference $\delta T_1$ between the reference reception timing $TT_0$ and the actual reception timing from each transmission station, and sends the result to each transmission station.

In order to execute the same transmission timing control as that executed in the second embodiment, a transmission station only need use the time difference $\delta T_1$ to calculate the time difference $\Delta T_1$ between the target reception timing $TT_1$ and the actual reception timing $RT_1$. Taking the reference target reception timing to be $TT_0$ and the window width to be $N_{win1}$, the target reception timing $TT_1$ is found from the following equation.

$$TT_1=TT_0+N_{win1}/2 \quad (6)$$

The following equations are also satisfied.

$$RT_1=TT_0+\delta T_1$$

$$\Delta T_1=RT_1-TT_1 \quad (7)$$

Therefore, from Equations (6) and (7), the time difference $\Delta T_1$ can be calculated from the equation below.

$$\Delta T_1=\delta T_1-N_{win1}/2 \quad (8)$$

A transmission station finds the transmission timing control value $\Delta T_1$ of this third embodiment by performing the calculation of Equation 8 above, and using that transmission timing control value $\Delta T_1$ executes transmission timing control in the same was as in the second embodiment. As shown in (B) of FIG. 16, at the instant that control converges, the signal can be received from the transmission station at the target reception timing $TT_1$, and since a distortion component caused by window function processing, and an inter-symbol interference component are not contained in the extracted received signal at the reference extraction position, it is possible to prevent deterioration of the reception characteristics.

(b) Transmission Station

Figure 17:
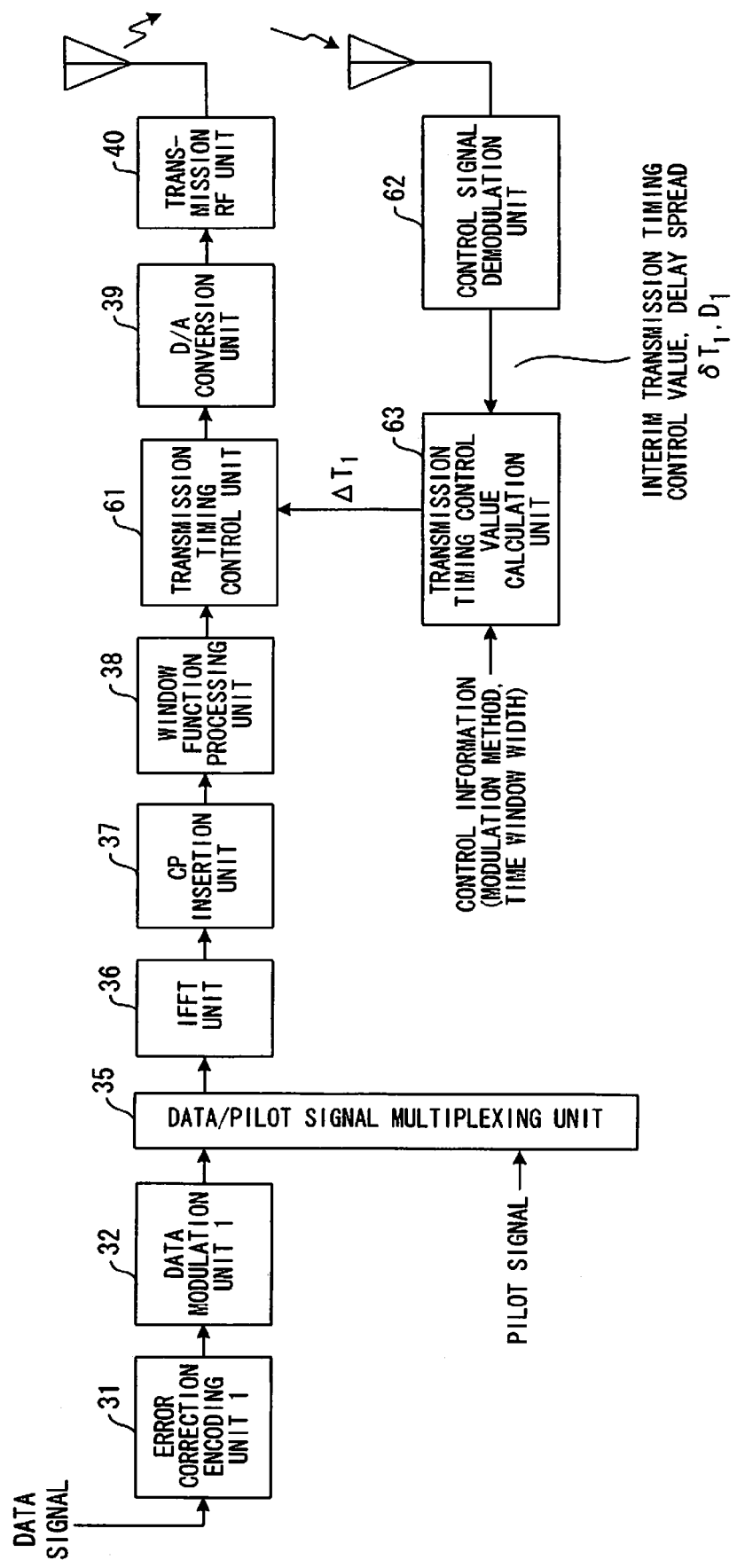
FIG. 17 is a block diagram of a transmission station of a third embodiment of the invention.

FIG. 17 is a block diagram of a transmission station of this third embodiment, where the same reference numbers are used for parts that are the same as those of the transmission station of the first embodiment shown in FIG. 1. This transmission station differs in that: (1) construction for transmitting a control signal that indicates the window width and data modulation method is removed; (2) there is a control signal demodulation unit 62 that receives a control signal that is sent from the receiving station (the time difference $\delta T_1$ between the reference reception timing $TT_0$ and the actual reception timing, and the delay spread $D_1$); (3) there is a transmission timing control value calculation unit 63 that uses the time difference $\delta T_1$ and window width $N_{win1}$ of the window function to calculate the transmission timing control value $\Delta T_1$; and (4) there is a transmission timing control unit 61 that uses the transmission timing control value $\Delta T_1$ to control the transmission timing. This third embodiment differs from the first embodiment in that the receiving station receives and demodulates signals from a plurality of transmission stations at the same time.

Except for not transmitting a control signal that indicates the window width and data modulation method, the transmission station of this third embodiment performs processing up to the processing by the window function processing unit 38 in the same way as the transmission station of the first embodiment. The control signal demodulation unit 62 demodulates the control signal that is fed back from the receiving station, extracts the time difference $\delta T_1$ between the reference reception timing $TT_0$ and the actual reception timing and the delay spread $D_1$, and inputs them to the transmission timing control value calculation unit 63. The transmission timing control value calculation unit 63 performs the calculation of Equation (8) and calculates the transmission timing control value $\Delta T_1$ ($=\delta T_1 - N_{win1}/2$).

The transmission timing control unit 61 controls the transmission timing of the transmission signal after multiplication by the window function so that the transmission control value $\Delta T_1$ becomes zero, and inputs the signal to the D/A conversion unit 39. After that, the D/A conversion unit 39 and transmission RF unit 40 perform the same processing on the signal that is transferred from the transmission timing control unit 61 as in the first embodiment, and transmit the signal from the transmission antenna.

(c) Receiving Station

Figure 18:
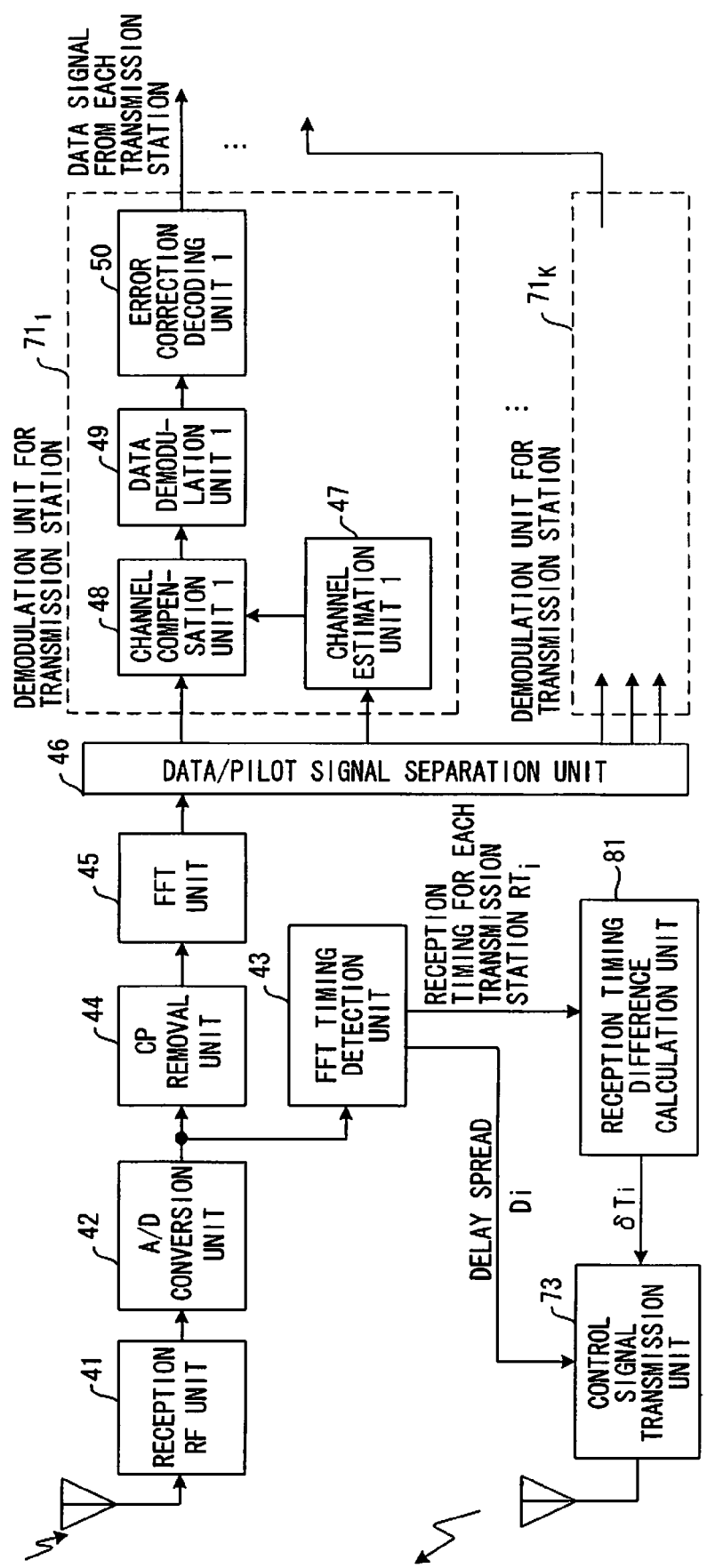
FIG. 18 is a block diagram of a receiving station of a third embodiment of the invention.
Figure 19:
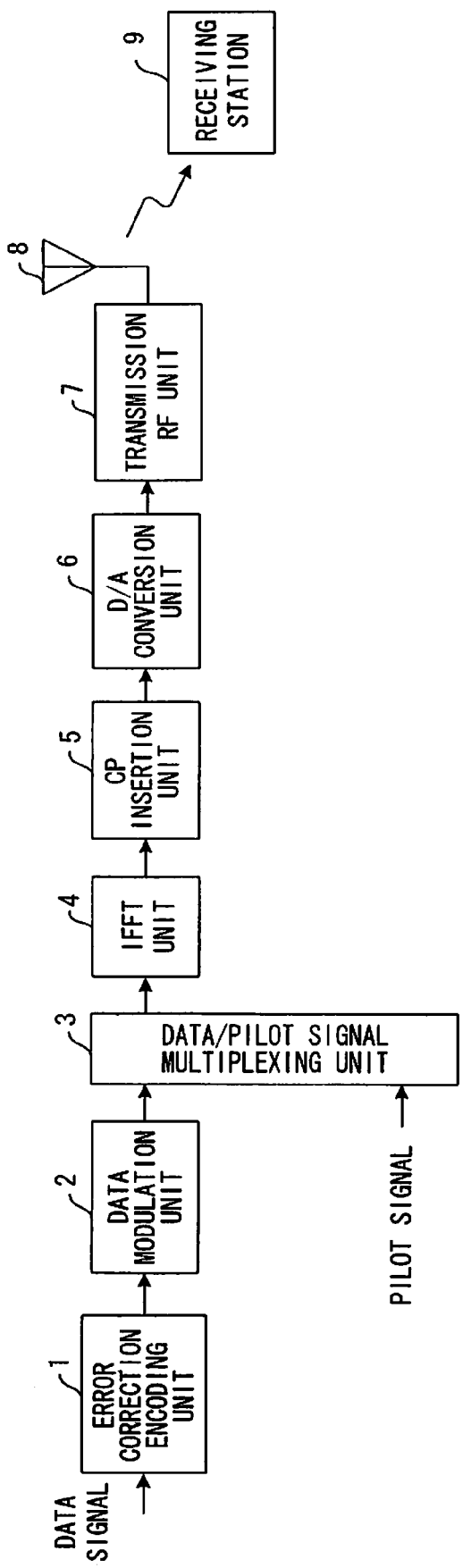
FIG. 19 is a block diagram of a typical transmission station in the OFDM method.
Figure 20:
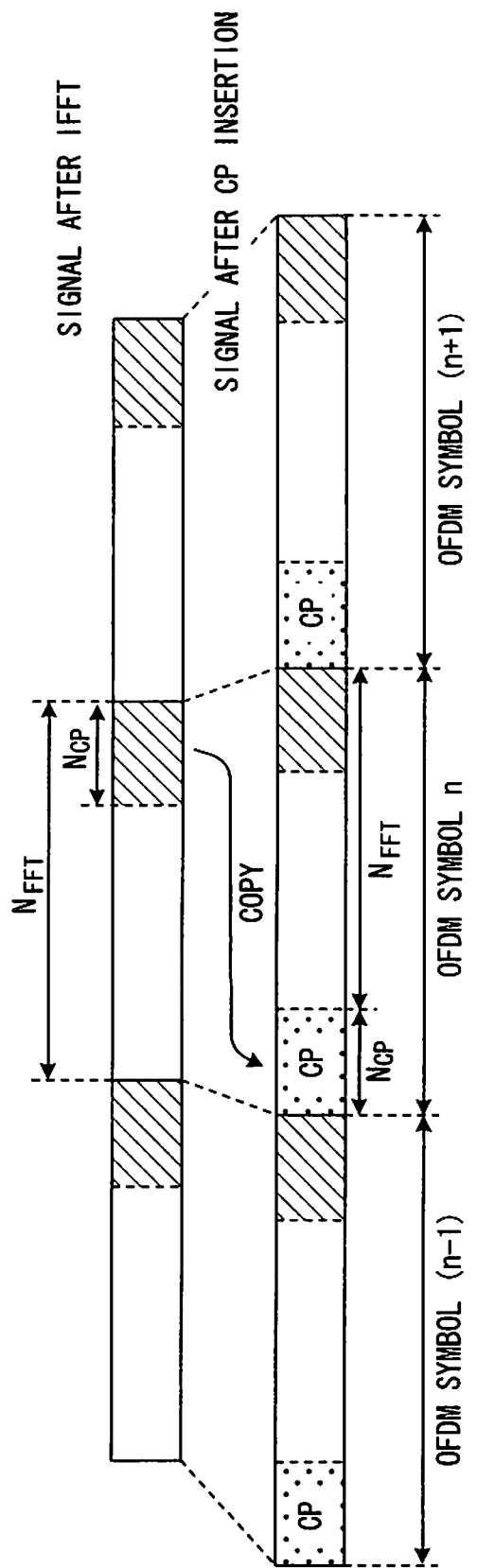
FIG. 20 is a drawing for explaining OFDM symbols.
Figure 21:
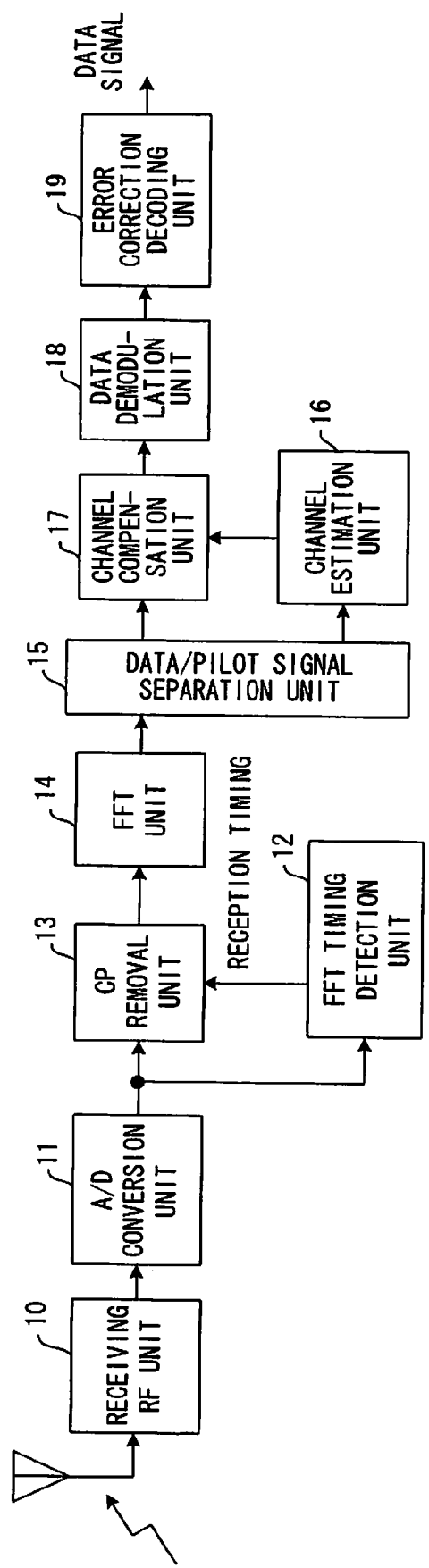
FIG. 21 is a block diagram of a typical receiving station in the OFDM method.
Figure 22:
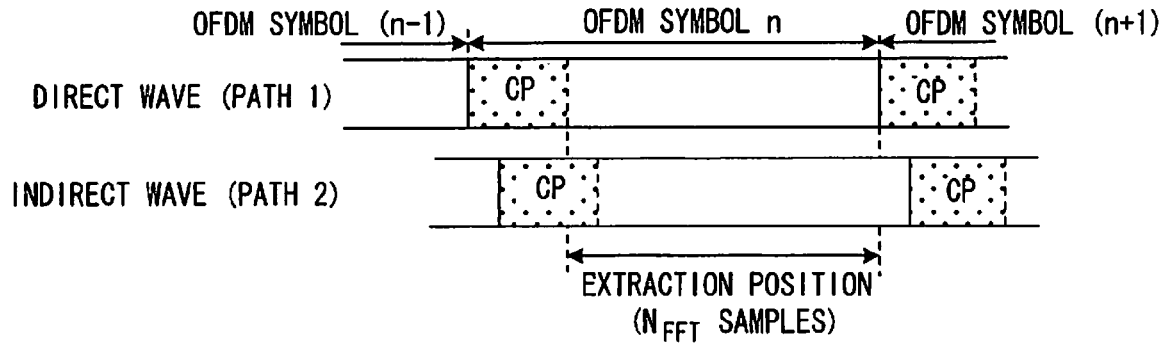
FIG. 22 is an example showing the state of extracting the effective signal components.
Figure 23:
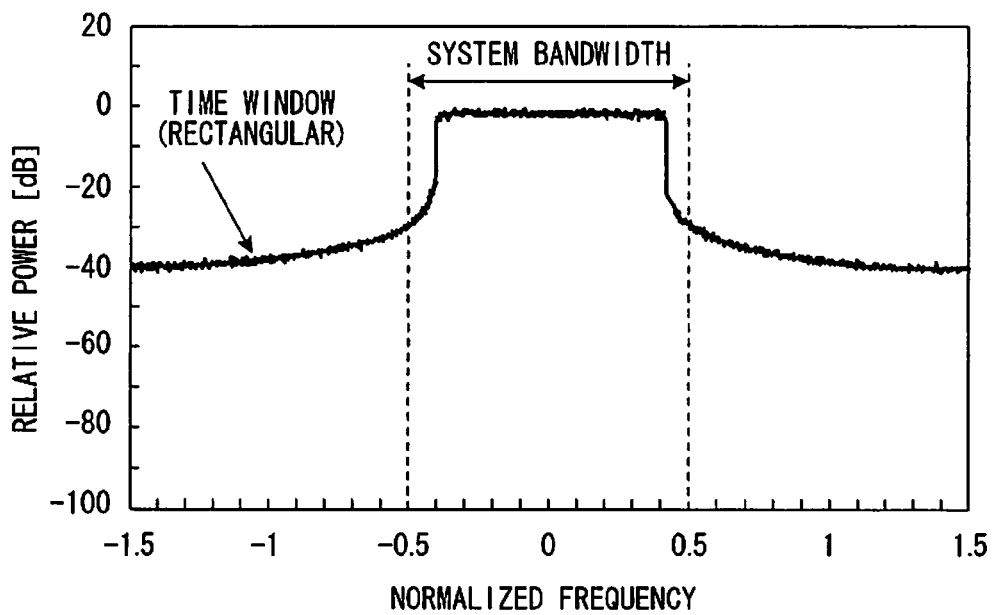
FIG. 23 is an example of the frequency spectrum of a signal that is transmitted from a transmission station.
Figure 24:
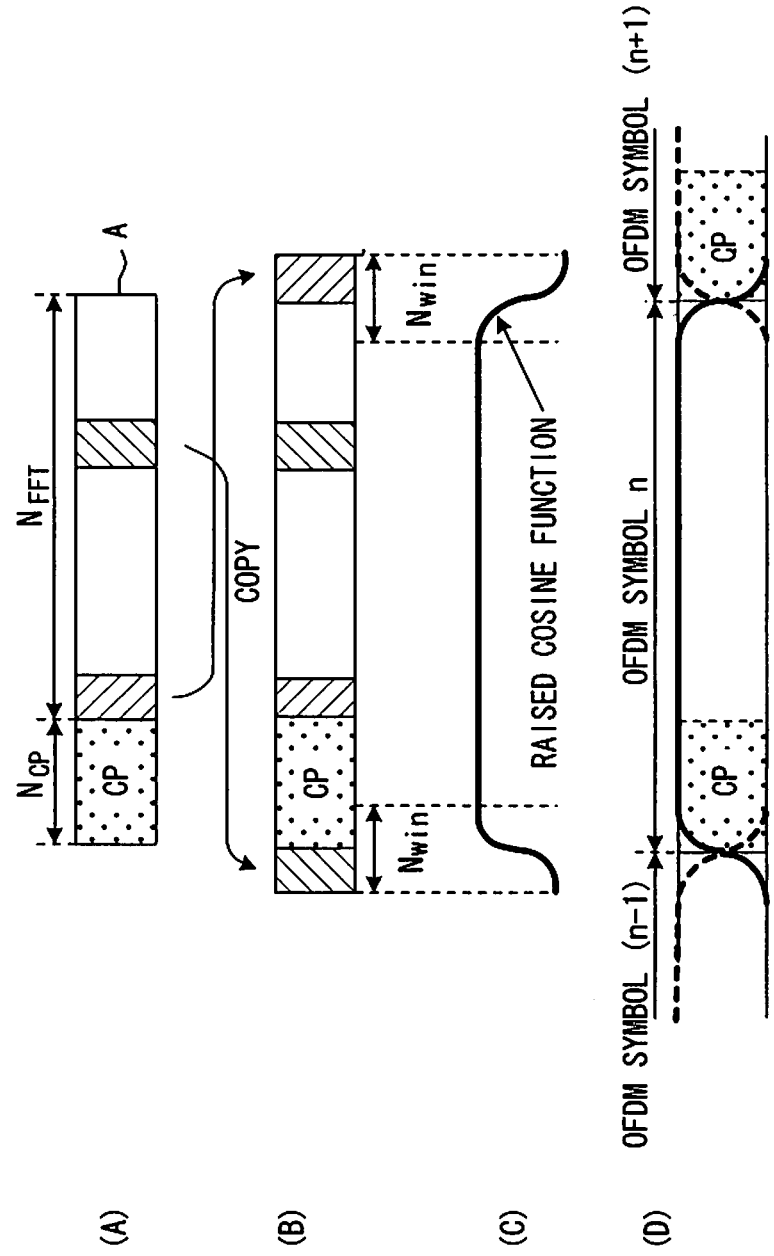
FIG. 24 is a drawing for explaining the state of multiplying the signal after CP insertion (OFDM symbol) by a window function.
Figure 25:
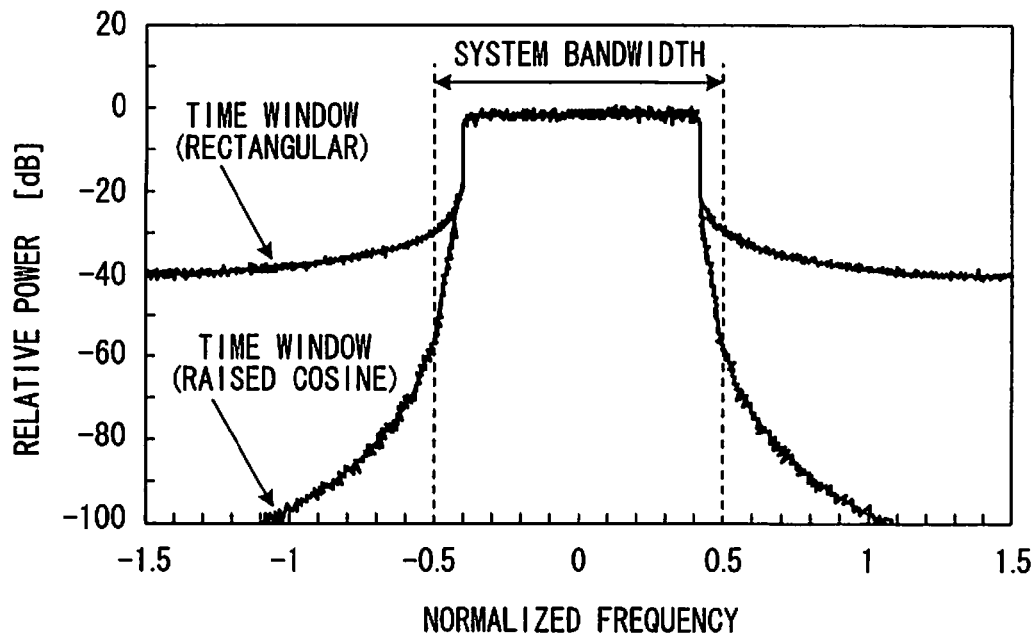
FIG. 25 shows the frequency spectrum of a transmission signal when the time window of a raised cosine function is applied.
Figure 26:
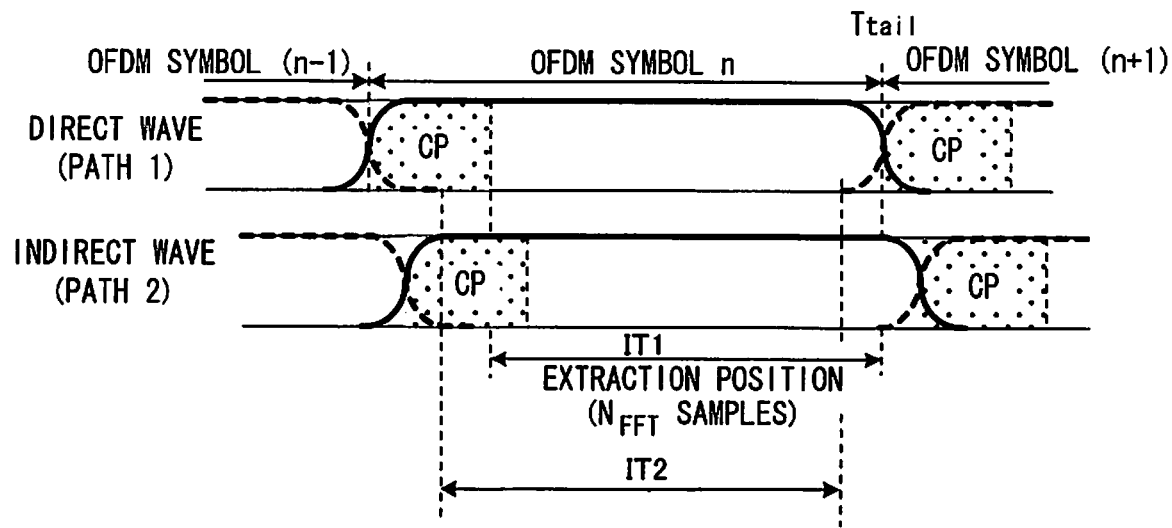
FIG. 26 is a drawing for explaining the state in which the CP removal unit of a receiving station extracts the effective signal components of the OFDM symbols from the received signal.

FIG. 18 is a block diagram of a receiving station of this third embodiment, where the same reference numbers are used for parts that are the same as those of the receiving station of the second embodiment shown in FIG. 13. This receiving station differs in that: (1) the control signal demodulation system (51~53) has been removed from the demodulation unit $71_1$ to $71_K$ that corresponds with the transmission station; (2) instead of the transmission timing control value generation unit 72, there is a reception timing difference calculation unit 81, where this reception timing difference calculation unit 81 calculates the time difference $\delta T_i$ (i=1 to K) between the actual reception timing $RT_i$ (i=1 to K) from each of the transmission stations and detected by the FFT timing detection unit 43 and the reference reception timing $TT_0$; and (3) the control signal transmission unit 73 sends the time difference $\delta T_i$ and delay spread $D_i$ to the respective transmission stations.

When the transmission timing control described above converges, the received signals from each of the transmission stations are extracted at the reference extraction positions in the same way as in the second embodiment. There is no distortion component caused by the window function processing, or inter-symbol interference component included in the extracted received signals, so it is possible to prevent deterioration of the reception characteristics. Moreover, since the amount of shifting of the extraction position is kept to a minimum, it is possible to effectively use CP.

Above, the transmission timing control value $\Delta T_1$ was decided based on Equation (8), however, the transmission timing control value $\Delta T_1$ can be adjusted based on the delay spread or the modulation method for the data channel. For example, when the delay spread $D_i$ exceeds a specified threshold value, preventing symbol interference from paths having a large delay time has precedence, and the transmission timing control value $\Delta T_1$ is decided according to the equation below.

$$\Delta T_1 = \delta T_i - N_{win1}/2 + \alpha_{DS} \qquad (9)$$

When the transmission timing control value $\Delta T_1$ is decided in this way, the extraction position for the received signal shifts backward $\alpha_{DS}$ at the instant when the transmission timing control converges, and thus the substantial CP length increases and the tolerance to the interference from adjacent symbols improves.

Moreover, when the modulation method for the data channel is QPSK, the effect due to distortion from window function processing is comparatively small, so the transmission timing control value $\Delta T_1$ is decided according to the following equation.

$$\Delta T_1 = \delta T_i - N_{win1}/2 + \alpha_{QPSK} \qquad (10)$$

When the reference reception timing is decided in this way, the extraction position for the received signal is shifted backward $\alpha_{QPSK}$ at the instant when the transmission timing control converges. Therefore, the reception characteristics are maintained, the substantial CP length increases, and the resistance to the interference from adjacent symbols improves.

With this third embodiment, it is possible to eliminate the distortion component due to window function processing and the component that receives interference from adjacent OFDM symbols from the extracted signal. Therefore, with the present invention the receiving station can effectively use CP, and can execute demodulation of transmission symbols without receiving the effect of distortion from window function processing.

EFFECT OF THE INVENTION

With this invention, a transmission station uses a control channel to notify a receiving station of the window width $N_{win}$ of a window function, and the receiving station adjusts the extraction position of the received signal based on the window width that is sent from the transmission station, so it is possible to eliminate the distortion component due to window function processing and the component that receives interference from adjacent OFDM symbols from the extracted signal. Therefore, with the present invention the receiving station can effectively use CP, and can execute demodulation of transmission symbols without receiving the effect of distortion from window function processing.

Moreover, with the present invention, the extraction position of the received signal is adjusted based on the modulation method of the transmission station or the delay spread of the radio channel, so when a modulation method is used that is not easily affected by distortion from window function processing, or when the delay spread of the radio channel is large, the extraction position can be adjusted so that the receiving station can effectively use CP.

With the present invention, each transmission station uses the control channel to notify the receiving station of the window width $N_{win}$ of the window function; the receiving station sets a timing for each transmission station at that is delayed from the reference reception timing according to the window width a target reception timing, measures the difference between the actual reception timing for receiving the signal transmitted from each transmission station and the target reception timing of each transmission station, then notifies each transmission station of the respective difference; and the transmission station adjusts that transmission timing so that the notified time difference becomes zero; so it is possible to eliminate the distortion component caused by window function processing and the component that receives interference from adjacent OFDM symbols from the signal extracted by the receiving station. Therefore, with the present invention, the receiving station can effectively use CP, and can execute demodulation processing of the transmitted signal without receiving the effect of distortion from window function processing.

Furthermore, with the present invention, the transmission timing is adjusted based on the modulation method of the transmission station or the delay spread of the radio channel, so when a modulation method is used that is not easily affected by distortion from window function processing, or when the delay spread of the radio channel is large, the extraction position can be adjusted so that the receiving station can effectively use CP.

With the present invention, the receiving station sets the reference reception timing for extracting the effective signal portion from the received signal, measures the difference $\delta T_i$ between the actual reception timing of the signals transmitted from each transmission station and the reference reception timing, and notifies the transmission stations of the difference; and the transmission station uses the difference $\delta T_i$ and the window width $N_{win}$ of the window function to adjust the transmission timing of the transmission signal, so it is possible to eliminate the distortion component caused by window function processing and the component that receives interference from adjacent OFDM symbols from the signal extracted by the receiving station. Therefore, with the present invention, the receiving station can effectively use CP, and can execute demodulation processing of the transmitted signal without receiving the effect of distortion from window function processing.

Moreover, with the present invention, the transmission timing is adjusted based on the modulation method of the transmission station or the delay spread of the radio channel, so when a modulation method is used that is not easily affected by distortion from window function processing, or when the delay spread of the radio channel is large, the extraction position can be adjusted so that the receiving station can effectively use CP.

What is claimed is:

1. A receiving station in a radio communication system, comprising:
    a receiving unit that receives a transmission signal that is transmitted from a transmission station wherein the transmission station performs window function processing on a signal to which cyclic prefixes have been attached for each specified number of samples, by multiplying the signal by a window function which weights the signal in the time domain so that the amplitude of the signal is gradually damped, and then transmits the transmission signal obtained by the window function processing to the receiving station;
    a control signal demodulation unit that demodulates a window width $N_{win}$ of said window function that is transmitted from the transmission station by a control channel wherein the window width indicates time interval during which the amplitude of the transmission signal is damped;
    a signal extraction position decision unit that decides a position for extracting the effective signal portion from the received signal based on said window width;
    a signal extraction unit that extracts the effective signal portion from the received signal at said extraction position; and
    a demodulation unit that uses the extracted effective signal portion to demodulate the transmission signal.

2. The receiving station of a radio communication system of claim 1, wherein said signal extraction position decision unit comprises:
    a reception timing period decision unit that finds the timing of the start of the transmission signal and sets the period of said specified number of samples from that timing as a reception timing period; and
    a signal extraction position adjustment unit that decides a period obtained by returning said reception timing period back in time by $N_{win}/2$ as the extraction position for the effective signal portion.

3. The receiving station of a radio communication system of claim 2 further comprising
    acquisition means for acquiring the modulation method of the transmission station or delay spread of the radio channel, wherein
    said signal extraction position adjustment unit adjusts said extraction position based on said modulation method of the transmission station or said delay spread of the radio channel.

4. A radio communication method, comprising:
    performing, by a transmission station, window function processing on a transmission signal to which cyclic prefixes have been attached for each specified number of samples, by multiplying the transmission signal by a window function which weights the transmission signal in the time domain so that the amplitude of the transmission signal is gradually damped, and then transmitting the signal to a receiving station;
    notifying the receiving station of a window width $N_{win}$ of said window function using a control channel from the transmission station wherein the window width indicates time interval during which the amplitude of the transmission signal is damped;
    adjusting an extraction position of the received signal in the receiving station based on said window width notified from the transmission station;
    extracting the effective signal portion from the received signal at said extraction position; and
    executing demodulation processing of the transmission signal using the extracted effective signal portion.

5. The radio communication method of claim 4 further comprising:
    finding the timing of the start of the transmission signal, and deciding a period of said specified number of samples from that timing as a reception timing period, and deciding a period obtained by returning said reception timing period back in time by $N_{win}/2$ as the extraction position of the effective signal portion.

6. The radio communication method of claim 4 further comprising;
adjusting the extraction position of said effective signal portion based on the modulation method of the transmission station, or delay spread of the radio channel.

7. A radio communication method in which each transmission station performs window function processing on a transmission signal to which cyclic prefixes have been attached for each specified number of samples, then transmits the signal, and a receiving station receives the signal and extracts effective signal portions from the received signal and demodulates the transmission signal from each transmission station, comprising:
notifying the receiving station of window width $N_{win}$ of said window function using a control channel from each transmission station;
setting a reference reception timing at which the effective signal portion is extracted from the received signal in the receiving station;
setting a timing for each transmission station that is delayed from the reference reception timing according to said window width as a target reception timing;
measuring a difference between an actual reception timing of the transmission signal from each transmission station and said target reception timing of each transmission station, and notifying each transmission station of that difference;
adjusting the transmission timing so that said notified difference becomes zero in each transmission station; and
using said extracted effective signal portion to demodulate the transmission signal from each transmission station.

8. The radio communication method of claim 7 further comprising:
setting a timing that is delayed by $N_{win}/2$ from the reference reception timing as the target reception timing of the transmission station.

9. The radio communication method of claim 7 further comprising:
adjusting said target reception timing based on the modulation method of the transmission station or delay spread of the radio channel.

10. A radio communication method in which each transmission station performs window function processing on a transmission signal to which cyclic prefixes have been attached for each specified number of samples, then transmits the signal, and a receiving station receives the signal and extracts effective signal portions from the received signal and demodulates the transmission signal from each transmission station, comprising:
setting in the receiving station, a reference reception timing at which the effective signal portion is extracted from the received signal;
measuring difference $\delta T_i$ between an actual reception timing of the transmission signal from each transmission station and said reference reception timing, and notifying each transmission station of that difference;
using said difference $\delta T_i$ and window width $N_{win}$ of said window function to adjust the transmission timing of the transmission signal in the transmission station; and
using said extracted effective signal portion to demodulate the signal transmitted from each transmission station.

11. The radio communication method of claim 10 further comprising:
quickening the transmission timing of the transmission signal by $(\delta T_i - N_{win}/2)$.

12. The radio communication method of claim 10 further comprising:
adjusting said transmission timing based on the modulation method of the transmission station or delay spread of the radio channel.

* * * * *